US005539581A

United States Patent [19]
Sato

[11] Patent Number: 5,539,581
[45] Date of Patent: Jul. 23, 1996

[54] ZOOM LENS SYSTEM

[75] Inventor: Haruo Sato, Kanagawa-ken, Japan

[73] Assignee: Nikon Corp., Tokyo, Japan

[21] Appl. No.: 490,587

[22] Filed: Jun. 15, 1995

[30] Foreign Application Priority Data

Jun. 17, 1994 [JP] Japan .................................. 6-159577
Jun. 17, 1994 [JP] Japan .................................. 6-159578

[51] Int. Cl.$^6$ .................................................. G02B 15/14
[52] U.S. Cl. .......................... 359/676; 359/681; 359/691; 359/692
[58] Field of Search .................................. 359/676, 681, 359/691, 692

[56] References Cited

U.S. PATENT DOCUMENTS

| 5,155,629 | 10/1992 | Ito et al. | 359/676 |
| 5,452,134 | 9/1995 | Sato | 359/682 |

FOREIGN PATENT DOCUMENTS

| 56-123512 | 9/1981 | Japan . |
| 56-158315 | 12/1981 | Japan . |
| 61-80214 | 4/1986 | Japan . |
| 01-185607 | 7/1989 | Japan . |
| 01-239516 | 9/1989 | Japan . |
| 05-88084 | 4/1993 | Japan . |

*Primary Examiner*—Mark Hellner
*Attorney, Agent, or Firm*—Armstrong, Westerman, Hattori, McLeland & Naughton

[57] ABSTRACT

A zoom lens system including, in order from the object side, a first lens unit having a negative refractive power and a second lens unit having a positive refractive power, in which zooming is effective by varying the spacing between the first lens unit and the second lens unit. The first lens unit has, in order from the object side, a negative meniscus lens element having a convex surface directed toward the object side, a negative lens element and a positive lens element. The second lens unit has, in order from the object side, a positive lens element having a convex surface directed toward the object side, a positive lens element, a cemented negative lens element composed of a positive lens element and a negative lens element, which are cemented together and a positive lens element. The first and second lens units and the elements thereof are positioned and arranged in prescribed relative positions.

19 Claims, 24 Drawing Sheets

Fig.18
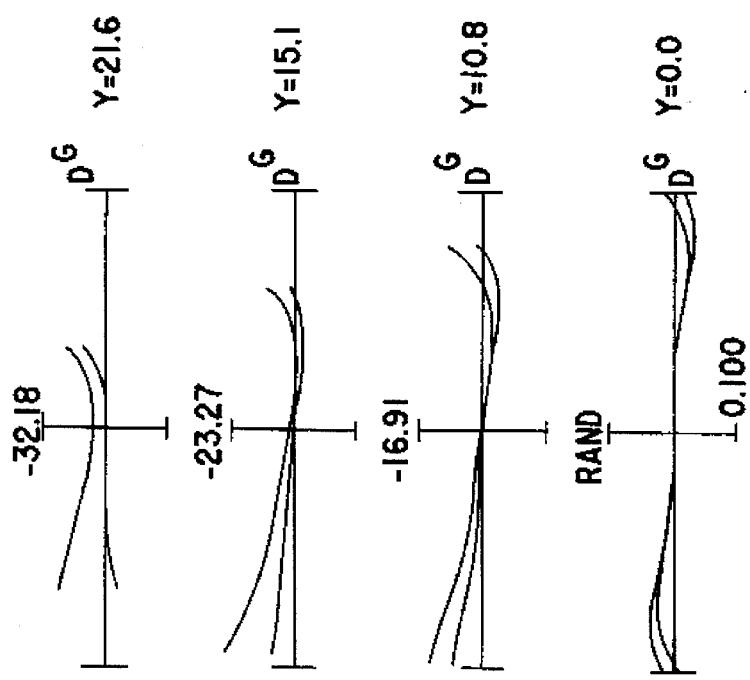
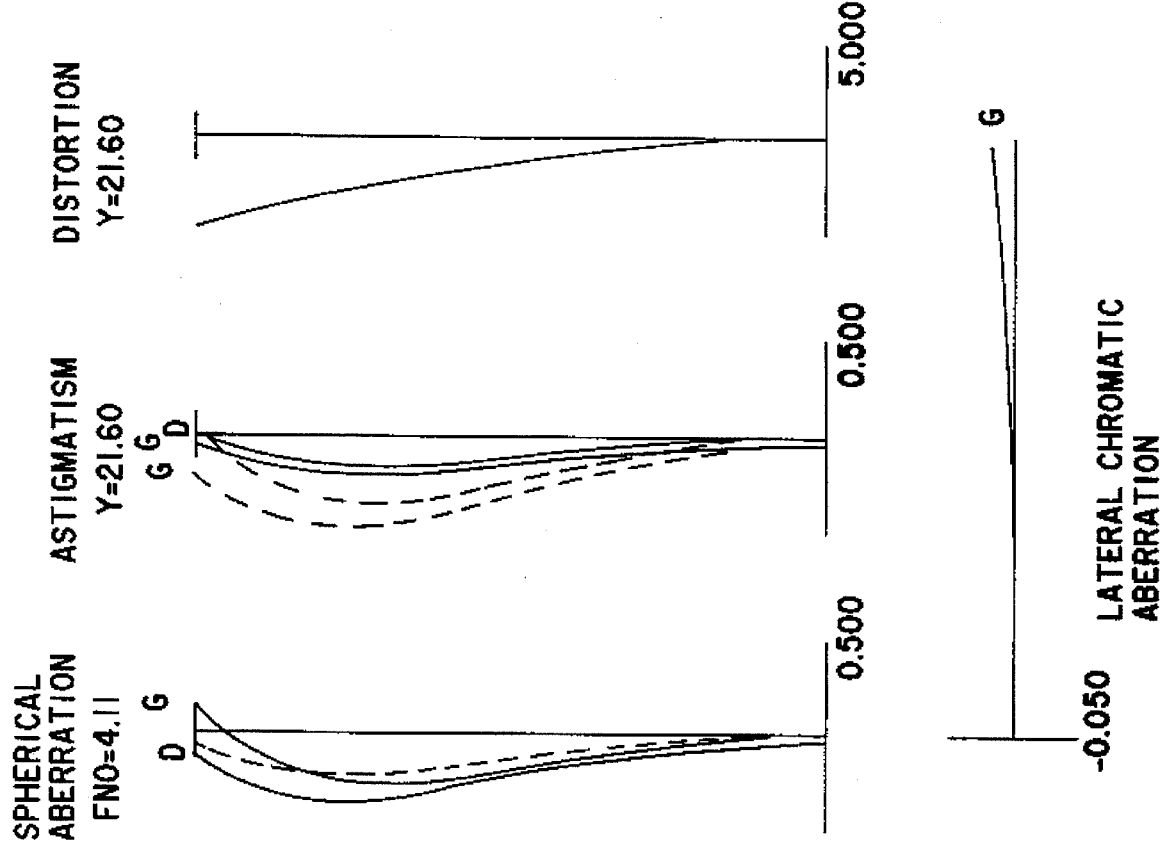

ZOOM LENS SYSTEM

BACKGROUND OF THE INVENTION:

The present invention relates to a zoom lens system and, more particularly, to a compact standard zoom lens system for use with such cameras as a single-lens reflex camera and a video camera.

Among interchangeable lenses for 35-mm still cameras, there are zoom lens systems which comprise two lens units, that is, a first lens unit having negative refractive power, and a second lens unit having positive refractive power, which are disposed in order from the object side. One type of such two-unit zoom lens system covers a standard angle of view and provides a zoom ratio of about 2 (this type of zoom lens system will hereinafter be referred to as "standard zoom lens system"). Recently, the use of such a standard zoom lens system in place of a standard lens system (i.e., a lens system which has a focal length of about 50 mm in the case of 35-mm camera) has become common in the art.

Accordingly, such a standard zoom lens system is attached to the camera body as a lens system for ordinary use, and it is therefore essential to minimize the size of the zoom lens system. It is also necessary to produce the standard zoom lens system in a compact form and at low cost while ensuring satisfactory image-forming performance.

The most suitable lens type for realizing such a standard zoom lens system is the above-described two-unit zoom lens system, which comprises a first lens unit having negative refractive power, and a second lens unit having positive refractive power. In regard to this type of zoom lens system, various lens arrangements have heretofore been proposed.

For example, Japanese Patent Laid-Open Publication (KOKAI) No. 56-123512 proposes a zoom lens system comprising only spherical lens elements.

Japanese Patent Laid-Open Publication (KOKAI) Nos. 01-239516 and 05-88084, filed by the present applicant, propose a zoom lens system which has realized high performance and a compact structure by introducing an aspherical surface.

Meanwhile, a two-unit zoom lens system comprising 7 lens elements has been proposed in, for example, Japanese Patent Laid-Open Publication (KOKAI) Nos. 01-185607 and 56-158315. Japanese Patent Laid-Open Publication (KOKAI) No. 61-80214 proposes a two-unit zoom lens system which has achieved a compact structure by using from 7 to 8 lens elements.

These conventional zoom lens systems suffer, however, from the following problems:

The zoom lens system disclosed in Japanese Patent Laid-Open Publication (KOKAI) No. 56-123512 comprises a relatively small number of lens elements, all of which are spherical lens elements. Therefore, it is favorable from the viewpoint of cost. However, the overall length of the lens system (hereinafter referred to as simply "overall length") at the wide end of the zoom range is considerably long. Thus, the proposed zoom lens system cannot be said to be compact as a whole. The zoom lens system also involves many problems in terms of aberration correction; it is not satisfactorily corrected for spherical aberration, particularly at the tele end of the zoom range. Accordingly, the zoom lens system needs further improvement as a two-unit zoom lens system having a zoom ratio of about 1.9.

The zoom lens system that is disclosed in Japanese Patent Laid-Open Publication (KOKAI) No. 01-239516 has realized a high performance and a compact structure by introducing an aspherical surface. However, an optical system that includes an aspherical surface tends to be costly in comparison to an optical system comprising only spherical lens elements. In addition, since aspherical surface processing is more difficult than spherical surface processing that has been established by conventional technique, an optical system including an aspherical surface is disadvantageous when it is intended to reduce the cost to the utmost limit.

It should be noted that in the zoom lens system is disclosed in Japanese Patent Laid-Open Publication (KOKAI) No. 01-239516, first and second lens units, which are disposed in order from the object side, have a negative meniscus configuration. This lens system is effective for further widening the viewing angle, but, on the other hand, it suffers from the disadvantage that the diameter of the front lens becomes relatively large because the height of obliquely incident light rays is relatively high. It should be noted that, in a case where the viewing angle at the wide end is of the order of $2\omega=64°$ as in the present invention, it is preferable for the second lens unit to have a planoconcave or biconcave configuration with a view to reducing the filter diameter and also reducing the size of the first and second lens units to thereby achieve a reduction in the overall weight and the overall cost.

The zoom lens system disclosed in Japanese Patent Laid-Open Publication (KOKAI) No. 05-88084 is an example of a lens arrangement which comprises the smallest number of lens elements among the zoom lens systems of this type, and hence excellent in terms of the achievement of a compact structure and a reduction of the cost. However, this zoom lens system involves a problem in terms of aberration correction. That is, the zoom lens system suffers from a somewhat large field curvature at the tele end.

Meanwhile, the zoom lens system that is disclosed in Japanese Patent Laid-Open Publication (KOKAI) No. 01-185607 realizes a two-unit zoom lens system comprising 7 lens elements without using an aspherical surface or the like. In this two-unit zoom lens system, however, the zoom ratio is disadvantageously small, and the overall length is unfavorably large. Thus, the reduction in size of the lens system has not satisfactorily been achieved.

In addition, each lens element that constitutes the first lens unit of the above-described zoom lens system is large in size. In this regard also, the zoom lens system needs to be improved in order to achieve a compact structure and a reduction in cost. From the viewpoint of performance also, the zoom lens system suffers from the problem that the variation of spherical aberration remains at the tele end in particular, and the variation of the lower comatic aberration caused by zooming also remains.

Further, the zoom lens system that is disclosed in Japanese Patent Laid-Open Publication (KOKAI) No. 56-158315 also suffers from the problems that the overall size is relatively large, and that the zoom ratio is disadvantageously small.

In the above-described zoom lens system, a negative lens element in the first lens unit which is disposed at the second position from the object side has a planoconcave or negative meniscus configuration. Accordingly, the diameter of the front lens becomes relatively large contrary to the intention of achieving a compact structure, resulting in an increase in cost.

Furthermore, the zoom lens system that is disclosed in Japanese Patent Laid-Open Publication (KOKAI) No. 61-80214 provides a relatively small zoom ratio and has a relatively small air spacing between the negative and positive lens elements among three lens elements, i.e., negative, negative and positive lens elements, which constitute the first lens unit. Accordingly, field curvature, astigmatism and negative comatic aberration cannot satisfactorily been corrected.

In general, when a two-unit zoom lens system, which comprises a negative lens unit and a positive lens unit, satisfies the relationship of the following expression (a), the overall length at the wide end and the overall length at the tele end are equal to each other, and the change in the overall length of the lens system caused by zooming is the smallest.

$$f1=-(fw \cdot ft)^{1/2} \quad (a)$$

where "fw" is the focal length of the entire lens system at the wide end, "ft" is the focal length of the entire lens system at the tele end, and "f1" is the focal length of the first lens unit G1.

Accordingly, it is not preferable to select the focal length f1 of the first lens unit G1 so that the zoom lens system deviates from the relationship of the expression (a) to a considerable extent, because the change in the overall length of the lens system caused by zooming would become excessively large.

Assuming that the magnification at the tele end of the second lens unit G2, which is a convergent lens unit, is βt, the relationship of the following expression (b) holds:

$$ft = f1 \cdot \beta t \quad (b)$$

It is necessary in order to reduce the size of the zoom lens system to use the second lens unit G2 such that the magnification thereof at the tele end exceeds 1. In order to satisfy the relationships of the above expressions (a) and (b) while making favorable aberration correction with a compact structure, it is necessary to use each lens unit having a relatively strong refractive power. Accordingly, in the conventional zoom lens systems, there has been a tendency to compose each lens unit of a relatively large number of lens elements. As a result, each lens unit has heretofore been likely to increase in thickness, thus weakening the effect of reducing the overall size to achieve a compact structure.

In view of the above-described problems of the related art, an object of the present invention is to provide a zoom lens system which has a high zoom ratio, a compact structure, a simple arrangement, a reduced cost, and yet favorable image-forming performance.

To attain the object, the present invention provides a zoom lens system wherein a refractive power distribution suitable for achieving a reduction in size of the lens system is set by taking into consideration the above-described two expressions (a) and (b), and wherein a first lens unit G1, which is a divergent lens unit, comprises 3 lens elements, that is, a negative lens element L1, a negative lens element L2, and a positive lens element L3, thereby realizing a zoom lens system having a compact structure, a minimal change in the overall length caused by zooming, and a reduced cost.

SUMMARY OF THE INVENTION:

The present invention provides a zoom lens system which includes, in order from the object side, a first lens unit G1 having a negative refractive power as a whole, and a second lens unit G2 having a positive refractive power as a whole, and in which zooming is effected by varying the spacing between the first lens unit G1 and the second lens unit G2. The first lens unit G1 has, in order from the object side, a negative meniscus lens element L1 having a convex surface directed toward the object side, a negative lens element L2, and a positive lens element L3. The second lens unit G2 has, in order from the object side, a positive lens element L4 having a convex surface directed toward the object side, a positive lens element L5, a cemented negative lens element L67 composed of a positive lens element L6 and a negative lens element L7, which are cemented together, and a positive lens element L8. The zoom lens system satisfies the following conditions:

$$0.65 \leq |f1|/(fw \cdot ft)^{1/2} \leq 1.0$$

$$-1 < q2 \leq 0$$

where f1 is the focal length of the first lens unit G1, fw is the focal length of the entire lens system at the wide end, ft is the focal length of the entire lens system at the tele end, and q2 is the shape factor of the negative lens element L2 in the first lens unit G1.

It is preferable to satisfy the following condition:

$$0.7 \leq f2/|f1| \leq 0.95$$

where f1 is the focal length of the first lens unit G1, and f2 is the focal length of the second lens unit G2.

It is even more desirable to satisfy the following condition:

$$0.1 \leq d78/fw \leq 0.25$$

where d78 is the axial air spacing between the image-side surface of the cemented negative lens element L67 and the object-side surface of the positive lens element L8 in the second lens unit G2, and fw is the focal length of the entire lens system at the wide end.

According to another aspect of the present invention, there is provided a zoom lens system which includes, in order from the object side, a first lens unit G1 having a negative refractive power as a whole, and a second lens unit G2 having a positive refractive power as a whole. The first lens unit G1 has, in order from the object side, a negative meniscus lens element L1 having a convex surface directed toward the object side, a biconcave lens element L2, and a positive lens element L3. The second lens unit G2 has, in order from the object side, a positive lens element L4, a positive lens element L5, a biconcave lens element L6, and a positive lens element L7. In the zoom lens system, zooming is effected by varying the spacing between the first lens unit G1 and the second lens unit G2. The zoom lens system satisfies the following conditions:

$$0.6 \leq |f1|/(fw \cdot ft)^{1/2} \leq 1$$

$$-1 \leq q2 \leq 0$$

$$0.04 \leq d4/dI \leq 0.4$$

where f1 is the focal length of the first lens unit G1, fw is the focal length of the entire lens system at the wide end, ft is the focal length of the entire lens system at the tele end, q2 is the shape factor of the biconcave lens element L2 in the first lens unit G1, d4 is the axial air spacing between the biconcave lens element L2 and the positive lens element L3 in the first lens unit G1, and dI is the axial overall thickness of the first lens unit G1. It is preferable to satisfy the following condition:

$$0.7 \leq f2/|f1| \leq 0.95$$

where f1 is the focal length of the first lens unit G1, and f2 is the focal length of the second lens unit G2.

Further, it is preferable to satisfy the following condition:

$$0.5 \leq f11/f12 \leq 1$$

where f11 is the focal length of the negative meniscus lens element L1 in the first lens unit G1, and f12 is the focal length of the biconcave lens element L2 in the first lens unit G1.

BRIEF DESCRIPTION OF THE DRAWINGS

FIG. 18 graphically shows various aberrations at the wide end in Example 5.

DETAILED DESCRIPTION OF PREFERRED EMBODIMENTS

Figure 1:
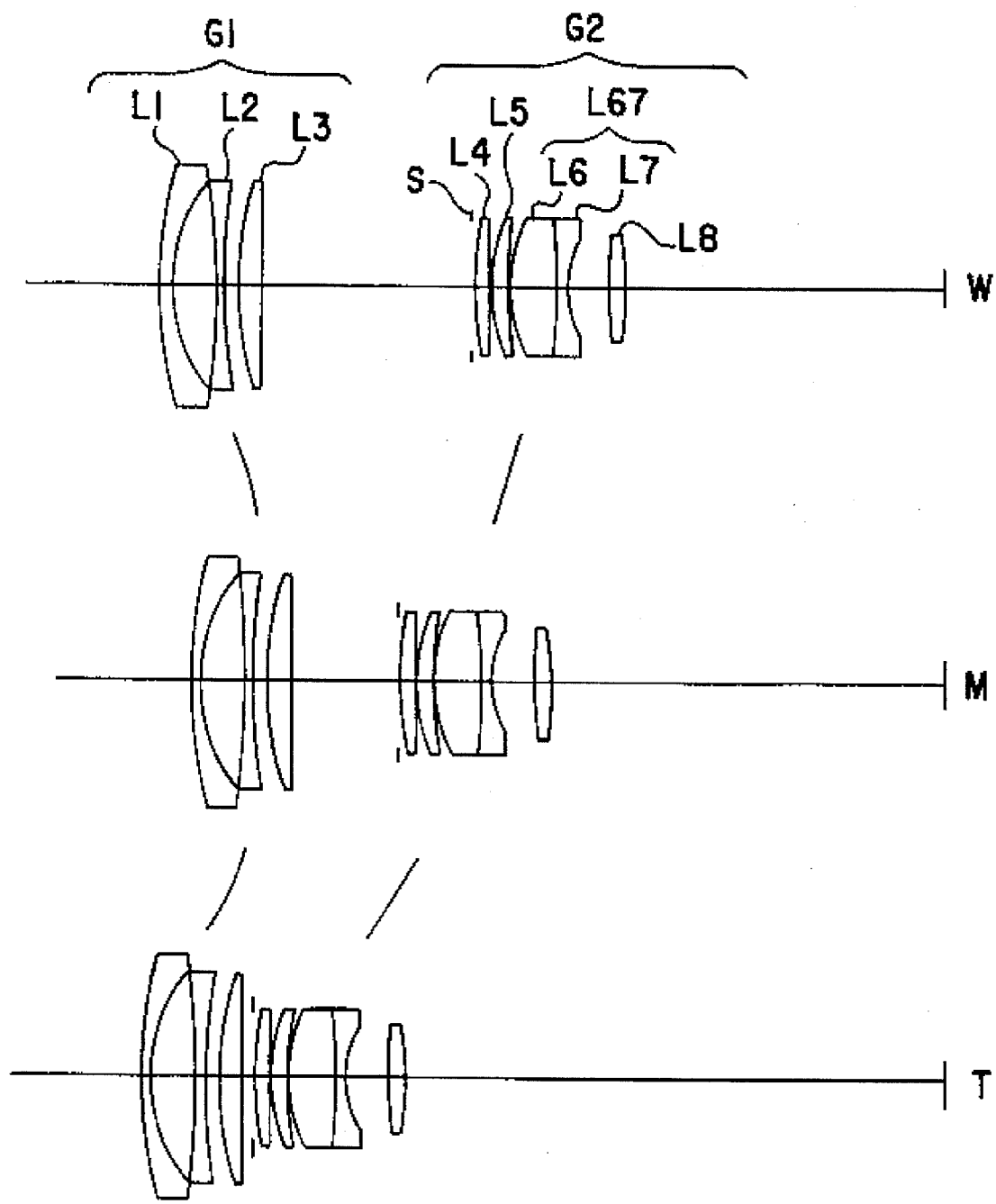
FIG. 1 shows the lens arrangement of a zoom lens system according to a first embodiment of the present invention, together with the movement of each lens unit during zooming.

The invention of the present application includes some zoom lens systems which may be roughly divided into two groups: those which are designed according to a first aspect of the present invention, and those according to a second aspect of the present invention. The zoom lens systems according to the first and second aspects of the present invention are largely different in basic lens arrangement from each other. Examples 1 to 3, which will be described later, relate to the zoom lens systems according to the first aspect of the present invention, and Examples 4 to 6, which will also be described later, relate to the zoom lens systems according to the second aspect of the invention.

Zoom lens systems according to the first aspect of the present invention, which correspond to Examples 1 to 3 (described later), are of the type which include, in order from the object side, a first lens unit G1 having a negative refractive power as a whole, and a second lens unit G2 having a positive refractive power as a whole, and in which zooming is effected by varying the spacing between the first lens unit G1 and the second lens unit G2. The first lens unit G1 has, in order from the object side, a negative meniscus lens element L1 having a convex surface directed toward the object side, a negative lens element L2, and a positive lens element L3. The second lens unit G2 has, in order from the object side, a positive lens element L4 having a convex surface directed toward the object side, a positive lens element L5, a cemented negative lens element L67 composed of a positive lens element L6 and a negative lens element L7, which are cemented together, and a positive lens element L8.

It should be noted that in Examples 1 to 3, an aperture stop S is provided between the first lens unit G1 and the second lens unit G2 so as to lie immediately in front of the object-side end of the second lens unit G2.

In Examples 2 and 3, a fixed stop SF is disposed immediately behind the image-side end of the second lens unit G2.

The aperture stop S and the fixed stop SF are movable along the optical axis together with the second lens unit G2 as one unit during zooming.

The zoom lens system having the above-described lens arrangement satisfies the following conditions (1) and (2):

$$0.65 \leq |f1|/(fw \cdot ft)^{1/2} \leq 1.0 \qquad (1)$$

$$-1 < q2 \leq 0 \qquad (2)$$

where:
f1: the focal length of the first lens unit G1;
fw: the focal length of the entire lens system at the wide end;
ft: the focal length of the entire lens system at the tele end; and
q2: the shape factor of the negative lens element L2 in the first lens unit G1.

It should be noted that the shape factor q of a lens is defined by the following expression (c):

$$q=(r2+r1)/(r2-r1) \tag{c}$$

where:

r1: the radius of curvature of the object-side surface of the lens; and r2: the radius of curvature of the image-side surface of the lens.

The conditional expression (1) relates to the change of the overall length in the entire zoom range. The conditional expression (1) indicates that when the value of the conditional expression (1) exceeds 1.0, the overall length reaches a maximum at the wide end, whereas, when the value thereof is less than 1.0, the overall length reaches a maximum at the tele end.

If the focal length ratio in the condition (1) exceeds the upper limit thereof, the overall length at the wide end becomes the longest. In this case, the diameter of the front lens increases, causing not only an increase in the filter diameter but also an increase in weight and a rise in cost, as described above.

In a case where a zoom lens system is employed as a lens system for ordinary use with a camera having a built-in strobe, for example, it is necessary to minimize the overall length at the wide end, at which the angle of view is large, in order to avoid vignetting of light from the built-in strobe. In this regard, it is disadvantageous that the focal length ratio exceeds the upper limit of the condition (1). Further, if the diameter of the front lens is forcedly reduced, the brightness of the edge of image field becomes insufficient.

Conversely, if the focal length ratio is less than the lower limit of the condition (1), the overall length becomes longest at the tele end. In this case, it becomes difficult to correct aberrations, particularly negative comatic aberration at the wide-end side, and spherical aberration and field curvature at the tele-end side. Moreover, the variation of negative comatic aberration caused by zooming markedly increases.

Therefore, it is practically preferable to determine a refractive power distribution within the range defined by the condition (1).

The condition (2) relates to the shape factor of the negative lens element L2, which is the second lens element from the object side in the first lens unit G1. The lower limit and the upper limit of the condition (2) correspond respectively to a planoconcave lens having a concave surface directed toward the image side, and a biconcave lens in which the absolute values of the curvature radii of both sides thereof are equal to each other. A lens configuration that satisfies the condition (2) falls within a range which is defined by the above-described planoconcave and biconcave lenses.

If q2 is not larger than the lower limit of the condition, i.e., −1, the negative lens element L2 in the first lens unit G1 changes from a planoconcave lens into a meniscus lens. As has been described above, in the case of a zoom lens system having a large angle of view at the wide end, the meniscus configuration is advantageous for correcting negative comatic aberration and other aberrations. In the case of the present invention, however, it is necessary to reduce the size of constituent lens elements, particularly, the negative meniscus lens element L1 and the negative lens element L2 in the first lens unit G1, in order to achieve a compact structure and a cost reduction. When the negative lens element L2 becomes a negative meniscus lens configuration, the height of obliquely incident light rays becomes higher at the wide end in particular. Consequently, the diameter of the front lens increases, and the overall weight increases, resulting in a rise in cost.

Further, as the zoom ratio or the aperture of a zoom lens system increases, it becomes more difficult to correct spherical aberration at the tele end. Therefore, it is not preferable for q2 to be not larger than the lower limit of the condition (2).

Conversely, if q2 exceeds the upper limit of the condition (2), the negative lens element L2 becomes a biconcave lens configuration in which the absolute value of the curvature radius of the object-side surface is smaller than the absolute value of the curvature radius of the image-side surface. In this case, it becomes difficult to correct negative comatic aberration and lateral chromatic aberration at the wide end.

Further, the variation of negative comatic aberration caused by zooming increases, unfavorably.

In order to realize even more favorable image-forming performance and a further reduction in size, it is preferable to satisfy the following condition (3):

$$0.7 \leq f2/|f1| \leq 0.95 \tag{3}$$

where:

f2: the focal length of the second lens unit G2.

The condition (3) is provided to set an appropriate range for the focal length f2 of the second lens unit G2. Since the size |f1| of the focal length of the first lens unit G1 in the condition (3) has already been set in the condition (1), the condition (3) will be explained below in view of the change of the focal length f2 of the second lens unit G2.

If the focal length ratio in the condition (3) is less than the lower limit thereof, the refractive power of the second lens unit G2 becomes considerably strong. Consequently, the change in the overall length decreases, but spherical aberration at the tele-end side is aggravated to a considerable extent, and the variation of spherical aberration caused by zooming also increases.

If it is intended to correct the spherical aberration while obtaining good balance with other aberrations, the number of lens elements constituting the second lens unit G2 increases, and the lens thickness increases, thus weakening the effect of reducing the overall size to achieve a compact structure.

In order to further enhance the effect of the present invention, it is preferable to set the lower limit of the condition (3) at 0.77 or more. With the narrowed range of the condition (3), spherical aberration and positive comatic aberration can be corrected even more effectively.

Conversely, if the focal length ratio exceeds the upper limit of the condition (3), the refractive power of the second lens unit G2 becomes weak. Consequently, the back focus of the lens system becomes a considerably large value, resulting in an increase in the overall length contrary to the intention of achieving a compact structure. In addition, the change in the overall length becomes considerably large, resulting in an increase in size of the lens system.

In order to further enhance the effect of the present invention, it is preferable to set the upper limit of the condition (3) at 0.9 or less. By doing so, it is possible to realize a more compact and low-cost zoom lens system which has a further reduced change of the overall length.

In order to realize even more favorable image-forming performance and a satisfactorily high zoom ratio, it is preferable to satisfy the following condition (4):

$$0.1 \leq d78/fw \leq 0.25 \tag{4}$$

where:

d78: the axial air spacing between the image-side surface of the cemented negative lens element L67 and the object-side surface of the positive lens element L8 in the second lens unit G2.

The condition (4) relates to the axial air spacing between the cemented negative lens element L67 and the positive lens element L8 in the second lens unit G2.

In many cases, the rear lens unit of a two-unit zoom lens system, which comprises a pair of negative and positive lens units, is formed by using a type of lens which is often found in medium telephoto lens systems, i.e., Ernostar type, Telesonnar type, etc. Such a medium telephoto lens type is suitable for a relatively large aperture lens system, and it is also suitable for favorably balancing distortion. Further, it is suitable for disposing the principal point at a forward position. Thus, the medium telephoto type lens arrangement is most suitable for use in the master part of the rear lens unit of a two-unit zoom lens system comprising a pair of negative and positive lens units. Particularly, in a power distribution where positive, positive, negative and positive refractive powers are distributed, the above-described advantageous features can be satisfactorily exhibited by ensuring a sufficient air spacing between the negative and positive lens elements in the rear part of the lens arrangement.

Accordingly, if d78/fw is less than the lower limit of the condition (4), the thickness of the rear part of the second lens unit G2 cannot effectively be increased in the case of a zoom lens system which is compact and has excellent cost performance as in the present invention. Consequently, the aberration correction balance between positive comatic aberration and spherical aberration at the tele-end side is destroyed, and thus both aberrations are aggravated.

In order to exhibit even more favorable effects, it is preferable to set the lower limit of the condition (4) at 0.11 or more, more preferably at 0.12 or more. Conversely, if the upper limit of the condition (4) is exceeded, the thickness of the second lens unit G2 increases considerably, resulting in an increase in the diameter of the rear lens. Further, the dead space between the first lens unit G1 and the second lens unit G2 becomes excessively small, so that it becomes impossible to ensure a sufficient zoom ratio.

In order to exhibit even more favorable effects, it is preferable to set the upper limit of the condition (4) at 0.2 or less, more preferably at 0.19 or less.

In order to further enhance the effect of the present invention, it is preferable to satisfy the following conditions (5) and (6):

$$0 \leq q3 \leq 1.1 \tag{5}$$

$$-1 \leq q8 \leq 0 \tag{6}$$

where:

$q3$: the shape factor of the positive lens element L3 in the first lens unit G1; and $q8$: the shape factor of the positive lens element L8 in the second lens unit G2.

The condition (5) defines an appropriate range for the shape factor of the positive lens element L3 in the first lens unit G1. The range for the positive lens element L3, which is defined by the lower and upper limits of the condition (5), corresponds to the range of from a biconvex lens in which the absolute values of the curvature radii of both surfaces thereof are equal to each other, to a planoconvex lens having a convex surface directed toward the object side, and further to a meniscus configuration close to a planoconvex lens, although there is an extremely small difference therebetween.

In the case of a zoom lens system which is intended to reduce the cost to the utmost limit as in the present invention, it is preferable to install an aperture stop between the first lens unit G1 and the second lens unit G2 instead of in the second lens unit G2 because the lens chamber of the lens barrel can be formed as an integral structure; this is advantageous from the viewpoint of the assembling operation and the decentration accuracy.

However, it is difficult to enlarge the spacing between the first and second lens units G1 and G2 to a considerable extent for reasons of aberration correction or from the viewpoint of achieving a compact lens system. Therefore, in a case where the positive lens element L3 in the first lens unit G1, which is the closest to the image side, has a markedly meniscus-shaped configuration, even if some axial air spacing (i.e., spacing between two vertices) can be ensured, the positive lens element L3 may interfere with the hardware that constitutes the aperture stop, making it practically impossible to produce the desired zoom lens system. Accordingly, it is desirable to satisfy the condition (5).

If $q3$ is less than the lower limit of the condition (5), i.e., 0, the positive lens element L3 becomes a positive lens having a smaller curvature radius at the image side thereof than at the object side thereof. Therefore, negative comatic aberration at the wide end in particular increases, and the variation of negative comatic aberration caused by zooming also increases, unfavorably.

Conversely, if $q3$ is larger than the upper limit of the condition (5), i.e., 1.1, the meniscus configuration of the positive lens element L3 is intensified. Consequently, the hardware of the aperture stop and the positive lens element L3 mechanically interfere with each other, as described above.

It should be noted that in order to further enhance the effect of the present invention, it is preferable to set the upper limit of the condition (5) at 1 or less.

The condition (6) relates to the shape factor of the positive lens element L8 in the second lens unit G2. In the case of a zoom lens system designed to be a low-cost and compact lens system as in the present invention, the configuration of the positive lens element L8 is of great significance from the viewpoint of aberration correction.

If $q8$ is less than the lower limit of the condition (6), i.e. −1, the positive lens element L8 changes from a planoconvex configuration having a convex surface directed toward the image side into a meniscus configuration. It gives rise to no serious problem when the power of the second lens unit G2 is relatively weak. However, in the case of the zoom lens system in which the second lens unit G2 has a relatively strong power as in the present invention, spherical aberration at the tele-end side is particularly aggravated.

Conversely, if $q8$ exceeds the upper limit of the condition (6), i.e., 0, the positive lens element L8 changes from a biconvex lens configuration in which the absolute values of the curvature radii of both sides thereof are equal to each other, into a planoconvex lens configuration having a convex surface directed toward the object side, and further into a positive meniscus lens configuration. In this case, it becomes difficult to correct positive comatic aberration at the tele-end side or at the middle focal length position. Thus, it is practically desirable to set $q8$ within the range that is defined between the upper and lower limits of the condition (6).

In order to further enhance the effect of the present invention, it is desirable to satisfy the following conditions (7) and (8):

$$1.6 < n1, \ 1.6 < n2 \tag{7}$$

$$d7/d67 < 0.55 \tag{8}$$

$$0.1 \leq Nn-Np \quad (9)$$

$$10 \leq vdp-vdn \quad (10)$$

where:

n1: the refractive index of the negative meniscus lens element L1 in the first lens unit G1;

n2: the refractive index of the negative lens element L2 in the first lens unit G1;

d67: the axial composite thickness of the negative cemented lens element L67 in the second lens unit G2;

d7: the axial center thickness of the negative lens element L7 constituting the negative cemented lens element L67 in the second lens unit G2;

Nn: the refractive index of the negative lens element L7 constituting the negative cemented lens element L67 in the second lens unit G2;

Np: the refractive index of the positive lens element L6 constituting the negative cemented lens element L67 in the second lens unit G2;

vdn: the Abbe's number of the negative lens element L7 constituting the negative cemented lens element L67 in the second lens unit G2; and vdp: the Abbe's number of the positive lens element L6 constituting the negative cemented lens element L67 in the second lens unit G2.

It should be noted that the refractive indices n1, n2, Nn and Np are refractive indices for the spectral d-line ($\lambda=587.6$ nm).

The condition (7) is provided to set an appropriate range for the refractive index of each of the two negative lens elements L1 and L2 in the first lens unit G1.

If the refractive index of either of the negative lens elements L1 and L2 deviates from the range of the condition (7), the curvature radius of the negative lens element in the first lens unit G1 becomes excessively small, particularly in the case of a zoom lens system which is compact and has a relatively small number of constituent lens elements. Thus, it becomes difficult to correct field curvature, distortion and negative comatic aberration at the wide end in particular.

It should be noted that if the lower limit for the refractive index "n1" is set at 1.7 or more, and further the lower limit for the refractive index "n2" is set at 1.7 or more, even more favorable image-forming performance can be obtained.

The condition (8) relates to the lens thickness of the negative cemented lens element L67 in the second lens unit G2. Generally, in the case of a zoom lens system designed as in the present invention, the negative lens element L7 must be formed by using a material of relatively low transmittance, including dense flint glass. On the other hand, the positive lens element L6, which constitutes the negative cemented lens element L67, may be formed by using a vitreous material having a relatively high transmittance.

In the present invention, the correction of spherical aberration and various other aberrations is supplemented by increasing the axial composite thickness of the negative cemented lens element L67. Therefore, the positive lens element L6, which has a relatively high transmittance, in the negative cemented lens element L67 must be formed with a relatively large axial center thickness. In addition, it is generally advantageous to reduce the overall weight of the negative lens element L7 in terms of the vitreous material cost when it is intended to reduce the cost to the utmost limit.

If the lens thickness ratio, i.e., d7/d67, deviates from the range defined by the condition (8), the thickness of the negative lens element L7 becomes larger than that of the positive lens element L6, resulting in a lowering of the transmittance and also a rise of the cost.

The condition (9) defines an appropriate range for the refractive index difference in the negative cemented lens element L67.

If the refractive index difference deviates from the range of the condition (9), it becomes impossible to ensure sufficient Petzval sum in a compact zoom lens system as in the case of the present invention. Consequently, field curvature and astigmatism are aggravated.

It should be noted that if the lower limit of the condition (9) is set at 0.2 or more, more preferably at 0.25 or more, the effect of the present invention is further enhanced.

The condition (10) defines an appropriate range for the Abbe's number difference in the negative cemented lens element L67.

If the Abbe's number difference deviates from the range of the condition (10), it becomes impossible to effectively correct the variation of axial chromatic aberration caused by zooming and lateral chromatic aberration with good balance in a zoom lens system which is compact and has a relatively small number of constituent lens elements as in the case of the present invention.

It should be noted that if the lower limit of the condition (10) is set at 15, more preferably 20, particularly preferably 25, it becomes possible to correct chromatic aberration even more effectively.

Next, zoom lens systems according to the second aspect of the present invention, which correspond to Examples 4 to 6 (described later), will be described.

Zoom lens systems according to Examples 4 to 6 (described later) are of the type which includes, in order from the object side, a first lens unit G1 having a negative refractive power as a whole, and a second lens unit G2 having a positive refractive power as a whole. The first lens unit G1 has, in order from the object side, a negative meniscus lens element L1 having a convex surface directed toward the object side, a biconcave lens element L2, and a positive lens element L3. The second lens unit G2 has, in order from the object side, a positive lens element L4, a positive lens element L5, a biconcave lens element L6, and positive lens element L7. Zooming is effected by varying the spacing between the first lens unit G1 and the second lens unit G2.

It should be noted that in Examples 4 to 6, an aperture stop S is provided between the positive lens elements L4 and L5 in the second lens unit G2.

In Example 6, a fixed stop SF is disposed immediately in front of the object-side end of the second lens unit G2, and another fixed stop SF is disposed immediately behind the image-side end of the second lens unit G2.

The aperture stop S and the fixed stops SF are movable along the optical axis together with the second lens unit G2 as one unit during zooming.

The zoom lens system having the above-described lens arrangement satisfies the following conditions (11) to (13):

$$0.6 \leq |f1|/(fw \cdot ft)^{1/2} \leq 1 \quad (11)$$

$$-1 \leq q2 \leq 0 \quad (12)$$

$$0.04 \leq d4/dI \leq 0.4 \quad (13)$$

where:

f1: the focal length of the first lens unit G1;

fw: the focal length of the entire lens system at the wide end;

ft: the focal length of the entire lens system at the tele end;

q2: the shape factor of the biconcave lens element L2 in the first lens unit G1;

d4: the axial air spacing between the biconcave lens element L2 and the positive lens element L3 in the first lens unit G1; and dI: the axial overall thickness of the first lens unit G1.

It should be noted that the shape factor q of a lens is defined by the expression (c), which has already been described above.

The axial overall thickness of the first lens unit G1 is the distance along the optical axis between the surface in the first lens unit G1 that is the closest to the object side and the surface in the first lens unit G1 that is the closest to the image side.

The conditional expression (11) relates to the change of the overall length in the entire zoom range. The conditional expression (11) indicates that when the value of the conditional expression (11) exceeds 1.0, the overall length reaches a maximum at the wide end, whereas, when the value thereof is less than 1.0, the overall length reaches a maximum at the tele end.

If the focal length ratio in the condition (11) exceeds the upper limit thereof, the overall length at the wide end becomes the longest. In this case, the diameter of the front lens increases, causing not only an increase in the filter diameter but also an increase in weight and a rise in cost.

In a case where a zoom lens system is employed as a lens system for ordinary use with a camera having a built-in strobe, for example, it is necessary to minimize the overall length at the wide end, at which the angle of view is large, in order to avoid vignetting of light from the built-in strobe. In this regard, it is disadvantageous that the focal length ratio exceeds the upper limit of the condition (11). Further, if the diameter of the front lens is forcedly reduced, the brightness of the edge of image field becomes insufficient.

Conversely, if the focal length ratio is less than the lower limit of the condition (11), the overall length becomes longest at the tele end. In this case, it becomes difficult to correct aberrations, particularly negative comatic aberration at the wide-end side, and spherical aberration, field curvature and astigmatism at the tele-end side. Moreover, the variation of negative comatic aberration caused by zooming markedly increases.

Therefore, it is practically preferable to determine a refractive power distribution within the range defined by the condition (11).

The condition (12) relates to the shape factor of the negative lens element L2, which is the second lens element from the object side in the first lens unit G1. The lower limit and the upper limit of the condition (12) correspond respectively to a planoconcave lens having a concave surface directed toward the image side, and a biconcave lens in which the absolute values of the curvature radii of both sides thereof are equal to each other. A lens configuration that satisfies the condition (12) falls within a range which is defined by the above-described planoconcave and biconcave lenses.

If q2 is less than the lower limit of the condition (12), the negative lens element L2 in the first lens unit G1 changes from a planoconcave lens into a meniscus lens. In the case of a zoom lens system having a large angle of view at the wide end, the negative lens element 12 having a meniscus configuration is advantageous for correcting negative comatic aberration and other aberrations. In the case of the present invention, however, it is necessary to reduce the size of constituent lens elements, particularly, the negative meniscus lens element L1 and the negative lens element L2 in the first lens unit G1, in order to achieve a compact structure and a cost reduction. When the negative lens element L2 becomes a negative meniscus lens configuration, the height of obliquely incident light rays becomes higher at the wide end in particular. Consequently, the diameter of the front lens increases, and the overall weight increases, resulting in a rise in cost.

Further, as the zoom ratio or the aperture of a zoom lens system increases, it becomes more difficult to correct spherical aberration at the tele end. Therefore, it is not preferable for q2 to be less than the lower limit of the condition (12).

It should be noted that the effect of the present invention can be further enhanced by setting the lower limit of the condition (12) at −0.9 or more, more preferably at −0.8 or more.

Conversely, if q2 exceeds the upper limit of the condition (12), the negative lens element L2 becomes a biconcave lens configuration in which the absolute value of the curvature radius of the object-side surface is smaller than the absolute value of the curvature radius of the image-side surface. In this case, it becomes difficult to correct negative comatic aberration and lateral chromatic aberration at the wide end.

Further, the variation of negative comatic aberration caused by zooming increases, unfavorably.

It should be noted that the effect of the present invention can be further enhanced by setting the upper limit of the condition (12) at −0.2 or less.

The condition (13) relates to the axial air spacing between the biconcave lens element L2 and the positive lens element L3 in the first lens unit G1.

If d4/dI is less than the lower limit of the condition (13), the spacing between the biconcave lens element L2 and the positive lens element L3 becomes excessively narrow, making it difficult to correct negative comatic aberration. Further, the height of obliquely incident light rays becomes higher, causing the diameter of the front lens to increase. In this case, if the diameter of the front lens is forcedly reduced, the brightness of the edge of image field is undesirably lowered.

It should be noted that it is possible to make even more favorable aberration correction and achieve a compact structure by setting the lower limit of the condition (13) at 0.06 or more, more preferably at 0.07 or more.

Conversely, if the upper limit of the condition (13) is exceeded, the spacing between the biconcave lens element L2 and the positive lens element L3 becomes excessively large, resulting in a reduction in the dead space between the first lens unit G1 and the second lens unit G2. Consequently, it becomes impossible to increase the zoom ratio.

It should be noted that the effect of the present invention can be further enhanced by setting the upper limit of the condition (13) at 0.3 or less, more preferably at 0.19 or less.

In order to realize even more favorable image-forming performance and a further reduction in size, it is preferable to satisfy the following condition (14):

$$0.7 \leq f2/|f1| \leq 0.95 \tag{14}$$

where:

f2: the focal length of the second lens unit G2.

The condition (14) is provided to set an appropriate range for the focal length f2 of the second lens unit G2. Since the size |f1| of the focal length of the first lens unit G1 in the condition (14) has already been set in the condition (11), the condition (14) will be explained below in view of the change of the focal length f2 of the second lens unit G2.

If the focal length ratio in the condition (14) is less than the lower limit thereof, the refractive power of the second lens unit G2 becomes considerably strong. Consequently, the change in the overall length decreases, but spherical aberration at the tele-end side is aggravated to a considerable extent, and the variation of spherical aberration caused by zooming also increases.

If it is intended to correct the spherical aberration while obtaining good balance with other aberrations, the number of lens elements constituting the second lens unit G2 increases, and the lens thickness increases, thus weakening the effect of reducing the overall size to achieve a compact structure.

In order to further enhance the effect of the present invention, it is preferable to set the lower limit of the condition (14) at 0.77 or more. With the narrowed range of the condition (14), spherical aberration and positive comatic aberration can be corrected even more effectively.

Conversely, if the focal length ratio exceeds the upper limit of the condition (14), the refractive power of the second lens unit G2 becomes weak. Consequently, the back focus of the lens system becomes a considerably large value, resulting in an increase in the overall length contrary to the intention of achieving a compact structure. In addition, the change in the overall length becomes considerably large, resulting in an increase in size of the lens system.

In order to further enhance the effect of the present invention, it is preferable set the upper limit of the condition (14) at 0.9 or less. By doing so, it is possible to realize a more compact and low-cost zoom lens system which has a further reduced change of the overall length.

In order to realize even more favorable image-forming performance and a reduction in size, it is preferable to satisfy the following condition (15):

$$0.5 \leq f11/f12 \leq 1 \quad (15)$$

where:
f11: the focal length of the negative meniscus lens element L1 in the first lens unit G1; and
f12: the focal length of the biconcave lens element L2 in the first lens unit G1.

The condition (15) defines an appropriate range for the ratio of the focal length of the negative meniscus lens element L1 to the focal length of the biconcave lens element L2 in the first lens unit G1. In the case of a low-cost and compact zoom lens system as in the present invention, an appropriate power distribution is needed for the two negative lens elements L1 and L2 in order to effectively suppress the variation of negative comatic aberration during zooming and the change caused by the difference in the height of incident light rays and to correct field curvature and distortion effectively.

If the focal length ratio is less than the lower limit of the condition (15), the power of the negative meniscus lens element L1 becomes considerably strong, and it becomes difficult to correct negative comatic aberration, field curvature and astigmatism.

It should be noted that it is possible to make even more favorable aberration correction by setting the lower limit of the condition (15) at 0.6 or more, more preferably at 0.7 or more.

Conversely, if the upper limit of the condition (15) is exceeded, the power of the negative lens element L2 becomes stronger than that of the negative lens element L1. Therefore, the height of obliquely incident light rays becomes considerably high, resulting in an increase in the overall size.

It should be noted that it is possible to realize a more compact and low-cost zoom lens system by setting the upper limit of the condition (15) at 0.9 or less.

In order to further enhance the effect of the present invention, it is preferable to satisfy the following conditions (16) and (17):

$$0 < r10 \quad (16)$$

$$0.15 < d12/dII \quad (17)$$

where:
r10: the radius of curvature of the image-side surface of the positive lens element L5 in the second lens unit G2;
d12: the axial air spacing between the biconcave lens element L6 and the positive lens element L7 in the second lens unit G2; and
dII: the axial overall thickness of the second lens unit G2.

It should be noted that the axial overall thickness dII of the second lens unit G2 is the distance along the optical axis between the surface in the second lens unit G2 that is the closest to the object side and the surface in the second lens unit G2 that is the closest to the image side.

The condition (16) means that the radius of curvature of the image-side surface of the positive lens element L5 in the second lens unit G2 is positive, that is, the positive lens element L5 has a concave surface directed toward the image side. In other words, the condition (16) means that the air lens between the positive lens element L5 and the biconcave lens element L6 has a biconvex configuration.

In the case of a two-unit zoom lens system having an exceedingly small number of constituent lens elements, the above-described air lens having a biconvex configuration is needed in order to increase the degree of freedom with which spherical aberration can be corrected. Accordingly, if the curvature radius of the image-side surface of the positive lens element L5 deviates from the range defined by the condition (16), it becomes difficult to correct spherical aberration, particularly at the tele-end side.

The condition (17) defines an appropriate range for the axial air spacing between the biconcave lens element L6 and the positive lens element L7 in the second lens unit G2.

If d12/dII deviates from the range defined by the condition (17), it becomes difficult to correct positive comatic aberration in the case of a zoom lens system having a small number of constituent lens elements as in the present invention.

Further, if the positive lens element L4 in the second lens unit G2 is formed into a biconvex lens configuration, spherical aberration at the tele-end side can be advantageously corrected. In addition, if the positive lens element L7 is formed into a positive lens configuration having a convex surface directed toward the image side (i.e., r14<0, where r14 is the curvature radius of the image-side surface of the positive lens element L7), positive comatic aberration can be advantageously corrected.

An effective way of favorably correcting spherical aberration at the tele-end side in particular is to make the center thickness of the biconcave lens element L6 (i.e., the thickness of the lens along the optical axis between the object-side surface and the image-side surface) larger than the center thickness of either the positive lens element L4 or the positive lens element L5.

Further, spherical aberration can be effectively corrected by using a vitreous material having a refractive index of 1.5 or more for the spectral d-line ($\lambda$=587.6 nm) as a material for the positive lens elements L4 and L5 in the second lens unit G2. Further, positive comatic aberration can be favorably corrected by selecting a material for the positive lens element L7 so that the refractive index for the spectral d-line of the positive lens element L7 is also 1.5 or more.

In addition, negative comatic aberration can be advantageously corrected by selecting a material for the negative meniscus lens element L1 and the biconcave lens element L2 in the first lens unit G1 so that the refractive index for the spectral d-line of these lens elements is 1.7 or more. Further, it is desirable for the positive lens element L3 to have a meniscus configuration.

Examples of the present invention will be explained below with reference to the accompanying drawings.

EXAMPLE 1

FIG. 1 shows the lens arrangement of a zoom lens system according to a first embodiment of the present invention, together with the movement of each lens unit during zooming. It should be noted that, in FIG. 1, W denotes the wide end, M a middle focal length position, and T the tele end.

The zoom lens system shown in FIG. 1 has, in order from the object side, a first lens unit G1, and a second lens unit G2. The first lens unit G1 has, in order from the object side, a negative meniscus lens element L1 having a convex surface directed toward the object side, a biconcave lens element L2 in which the absolute value of the curvature radius of the image-side surface is smaller than that of the object-side surface, and a biconvex lens element L3 in which the curvature radius of the object-side surface is smaller than that of the image-side surface. The second lens unit G2 has, in order from the object side, a positive meniscus lens element L4 having a convex surface directed toward the object side, a positive meniscus lens element L5 having a convex surface directed toward the object side, a negative cemented lens element L67 composed of a biconvex lens element L6 and a biconcave lens element L7, which are cemented together, and a biconvex lens element L8 in which the curvature radius of the image-side surface is smaller than that of the object-side surface.

Table 1 below shows numerical data in Example 1 of the present invention. In Table 1, reference symbol f denotes the focal length, $F_{NO}$ is F-number, and $2\omega$ is the angle of view. Further, the surface Nos. are put as ordinal Nos. of the lens surfaces from the object side, and the refractive indices and the Abbe's numbers are values for the spectral d-line ($\lambda$=587.6 nm).

TABLE 1 f = from 36 to 77.6 mm
$F_{NO}$ = from 3.9 to 5.9
$2\omega$ = from 64.6 to 31.2°

| Surface No. | Curvature radius | Surface separation | Abbe's number | Refractive index |
|---|---|---|---|---|
| 1 | 65.941 | 1.60 | 37.2 | 1.83400 |
| 2 | 21.663 | 6.00 | | |
| 3 | −119.939 | 1.50 | 37.2 | 1.83400 |
| 4 | 71.36 | 2.15 | | |
| 5 | 40.732 | 3.70 | 25.4 | 1.80518 |
| 6 | −493.366 | (d6 = variable) | | |
| 7 | 48.87 | 2.00 | 50.3 | 1.72000 |
| 8 | 422.928 | 0.10 | | |
| 9 | 20.803 | 2.70 | 59.0 | 1.51823 |
| 10 | 72.239 | 0.10 | | |
| 11 | 19.805 | 6.80 | 64.1 | 1.51680 |
| 12 | −121.457 | 1.70 | 33.3 | 1.80610 |
| 13 | 13.733 | 6.25 | | |
| 14 | 101.398 | 2.20 | 61.2 | 1.58913 |
| 15 | −51.511 | (d15 = variable) | | |

(Spacings which are variable during zooming)

| f | 36.0000 | 50.0000 | 77.6000 |
|---|---|---|---|
| d6 | 31.5162 | 16.0660 | 1.9355 |
| d15 | 46.9186 | 57.7923 | 79.2292 |

TABLE 1-continued (Values corresponding to the conditions)

| (1) | $|f1|/(fw \cdot ft)^{1/2}$ = | 0.957 |
|---|---|---|
| (2) | q2 = | −0.25 |
| (3) | f2/|f1| = | 0.777 |
| (4) | d78/fw = | 0.174 |
| (5) | q3 = | 0.85 |
| (6) | q8 = | −0.33 |
| (7) | n1 = | 1.834 |
| (7) | n2 = | 1.834 |
| (8) | d7/d67 = | 0.2 |
| (9) | Nn–Np = | 0.289 |
| (10) | νdp–νdn = | 30.9 |

Figure 2:
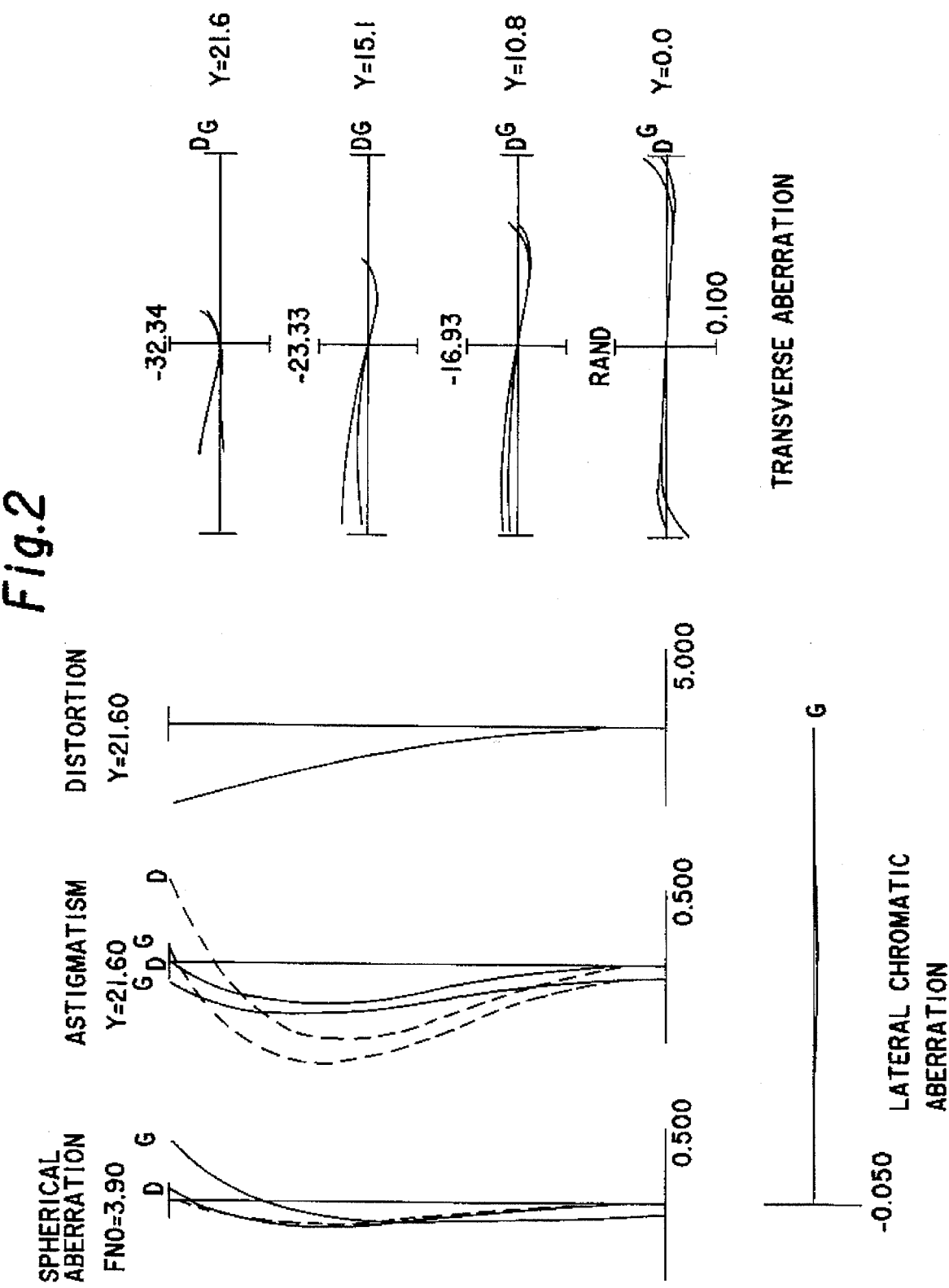
FIG. 2 graphically shows various aberrations at the wide end in Example 1.
Figure 3:
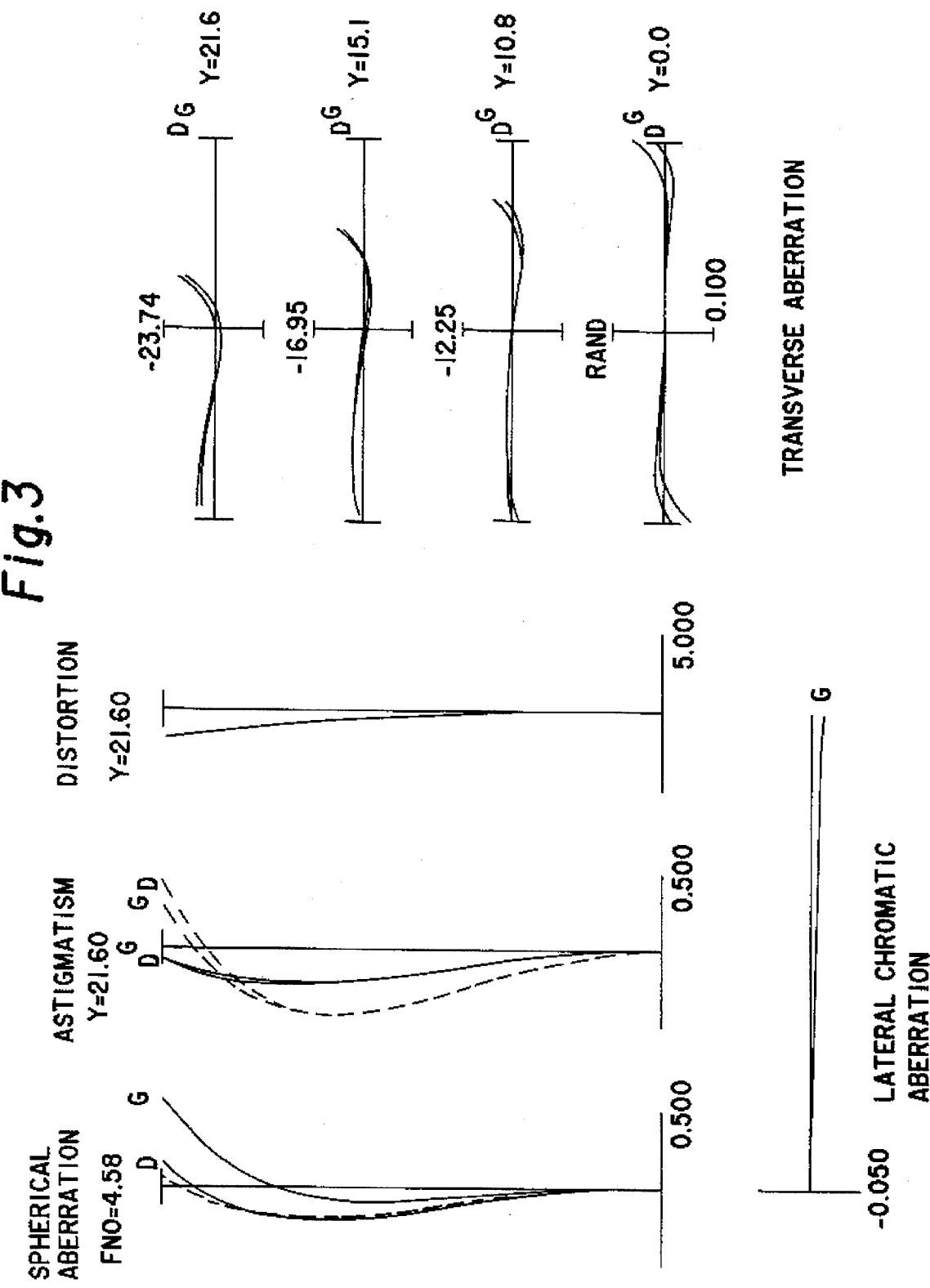
FIG. 3 graphically shows various aberrations at a middle focal length position in Example 1.
Figure 4:
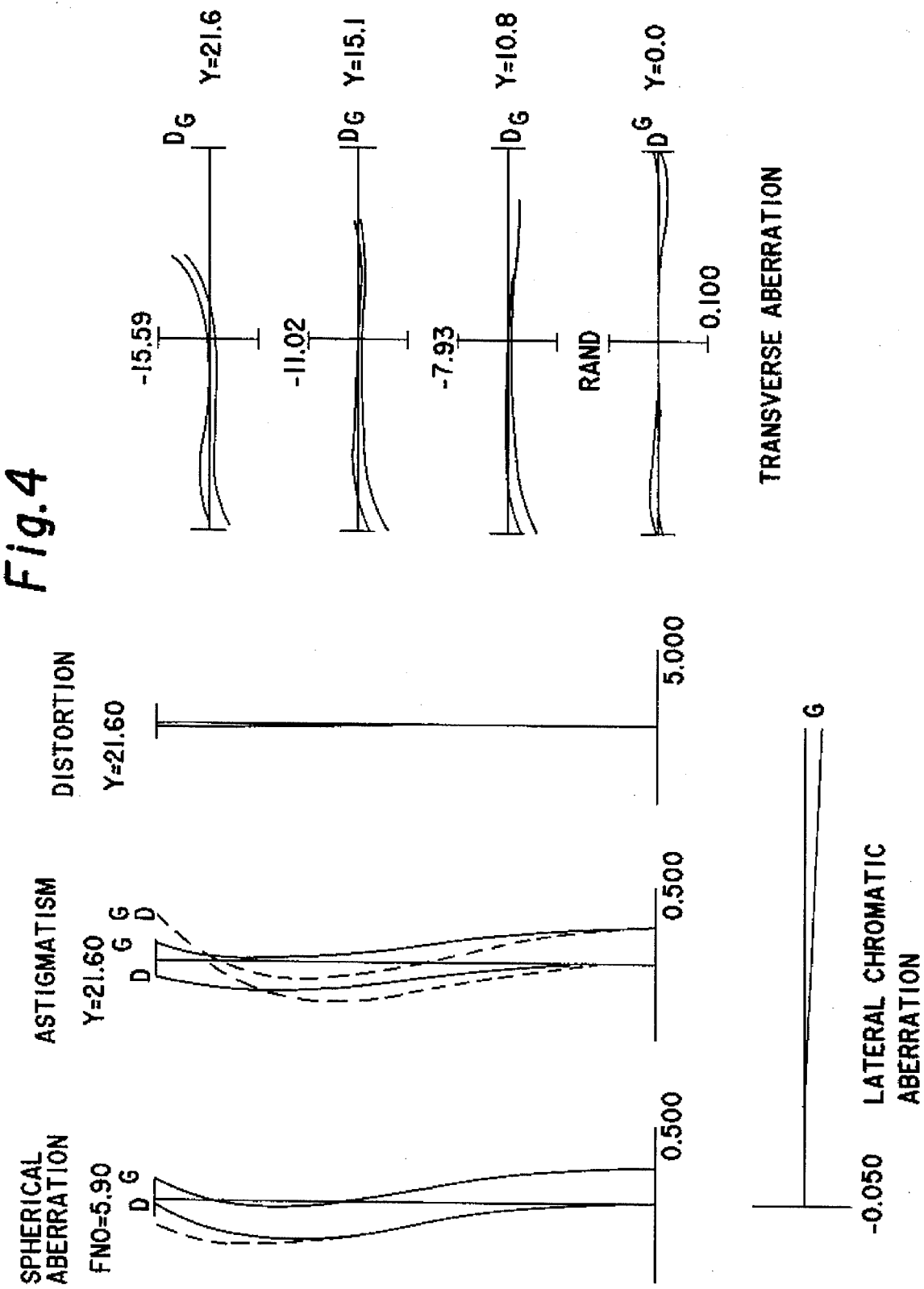
FIG. 4 graphically shows various aberrations at the tele end in Example 1.

FIGS. 2 to 4 graphically show various aberrations in Example 1: FIG. 2 shows various aberrations at the wide end; FIG. 3 shows various aberrations at a middle focal length position; and FIG. 4 shows various aberrations at the tele end.

In these figures, $F_{NO}$ is F-number, Y is the image height, D is the d-line ($\lambda$=587.6 nm), and G is the g-line ($\lambda$=435.8 nm).

In the graphs showing astigmatism, the solid line shows a sagittal image surface, and the broken line shows a meridional image surface. In the graphs showing spherical aberration, the broken line shows the sine condition.

It will be clearly understood from these figures that the zoom lens system in this example is favorably corrected for various aberrations at each focal length position.

EXAMPLE 2

Figure 5:
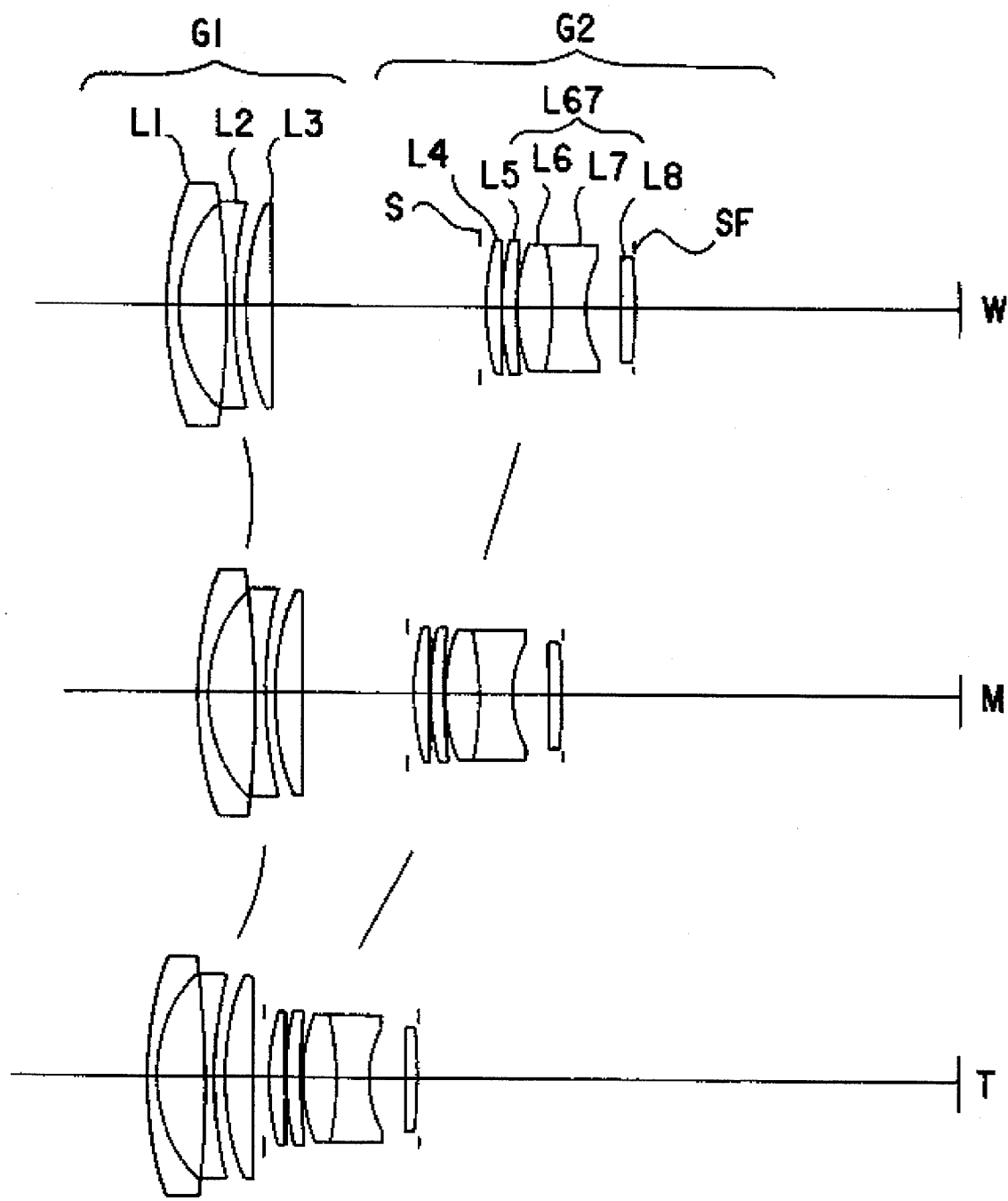
FIG. 5 shows the lens arrangement of a zoom lens system according to a second embodiment of the present invention, together with the movement of each lens unit during zooming.

FIG. 5 shows the lens arrangement of a zoom lens system according to a second embodiment of the present invention, together with the movement of each lens unit during zooming. It should be noted that, in FIG. 5, W denotes the wide end, M a middle focal length position, and T the tele end.

The zoom lens system shown in FIG. 5 has, in order from the object side, a first lens unit G1, and a second lens unit G2. The first lens unit G1 has, in order from the object side, a negative meniscus lens element L1 having a convex surface directed toward the object side, a biconcave lens element L2 in which the absolute value of the curvature radius of the image-side surface is smaller than that of the object-side surface, and a negative meniscus lens element L3 having an exceedingly gentle meniscus configuration with a convex surface directed toward the object side. The second lens unit G2 has, in order from the object side, a positive meniscus lens element L4 having a convex surface directed toward the object side, a positive meniscus lens element L5 having a convex surface directed toward the object side, a negative cemented lens element L67 composed of a biconvex lens element L6 and a biconcave lens element L7, which are cemented together, and a biconvex lens element L8 in which the curvature radius of the image-side surface is smaller than that of the object-side surface.

Table 2 below shows numerical data in Example 2 of the present invention. In Table 2, reference symbol f denotes the focal length, $F_{NO}$ is F-number, and $2\omega$ is the angle of view. Further, the surface Nos. are put as ordinal Nos. of the lens surfaces from the object side, and the refractive indices and the Abbe's numbers are values for the spectral d-line ($\lambda$=587.6 nm).

TABLE 2 f = from 36 to 77.6 mm
$F_{NO}$ = from 3.9 to 5.9
2ω = from 64.4 to 31.1°

| Surface No. | Curvature radius | Surface separation | Abbe's number | Refractive index |
|---|---|---|---|---|
| 1 | 48.724 | 1.60 | 45.4 | 1.79668 |
| 2 | 20.296 | 7.00 | | |
| 3 | −116.326 | 1.50 | 45.4 | 1.79668 |
| 4 | 57.979 | 1.70 | | |
| 5 | 37.362 | 3.90 | 28.6 | 1.79504 |
| 6 | 10564.590 | (d6 = variable) | | |
| 7 | 30.628 | 2.30 | 58.5 | 1.61272 |
| 8 | 140.573 | 0.10 | | |
| 9 | 34.587 | 2.30 | 55.6 | 1.69680 |
| 10 | 128.595 | 0.10 | | |
| 11 | 23.566 | 5.00 | 70.4 | 1.48749 |
| 12 | −64.670 | 5.40 | 33.9 | 1.80384 |
| 13 | 16.455 | 5.00 | | |
| 14 | 257.776 | 2.20 | 45.4 | 1.79668 |
| 15 | −50.006 | 0.00 | | |
| 16 | ∞ | (d16 = variable) | | (fixed stop SF) |

(Spacings which are variable during zooming)

| f | 36.0000 | 50.0000 | 77.6000 |
|---|---|---|---|
| d6 | 32.0443 | 16.5860 | 2.4480 |
| d16 | 48.3565 | 59.2433 | 80.7059 |

(Values corresponding to the conditions)

| (1) $|f1|/(fw \cdot ft)^{1/2}$ = | 0.956 |
|---|---|
| (2) q2 = | −0.33 |
| (3) f2/|f1| = | 0.778 |
| (4) d78/fw = | 0.139 |
| (5) q3 = | 1.0 |
| (6) q8 = | −0.68 |
| (7) n1 = | 1.797 |
| (7) n2 = | 1.797 |
| (8) d7/d67 = | 0.519 |
| (9) Nn−Np = | 0.316 |
| (10) vdp−vdn = | 36.5 |

Figure 6:
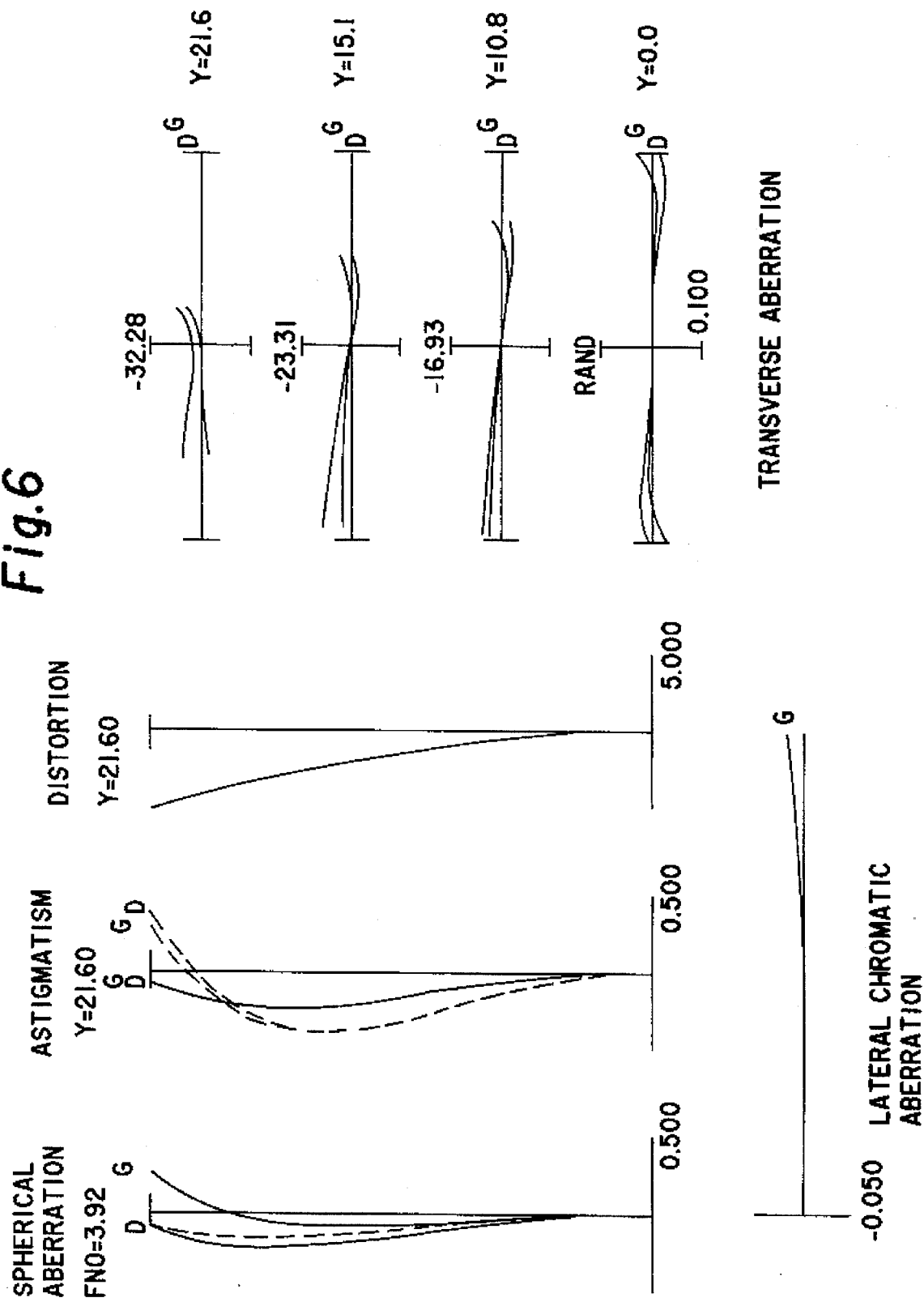
FIG. 6 graphically shows various aberrations at the wide end in Example 2.
Figure 7:
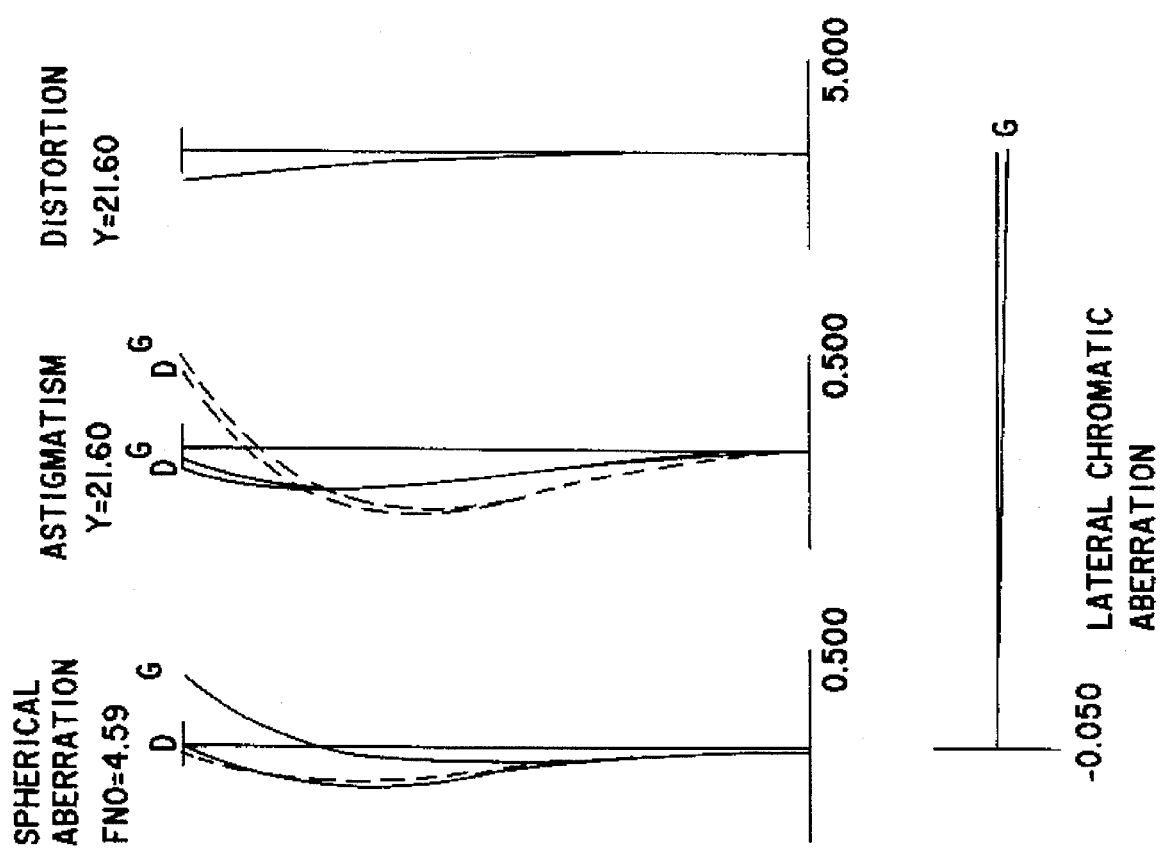
FIG. 7 graphically shows various aberrations at a middle focal length position in Example 2.
Figure 8:
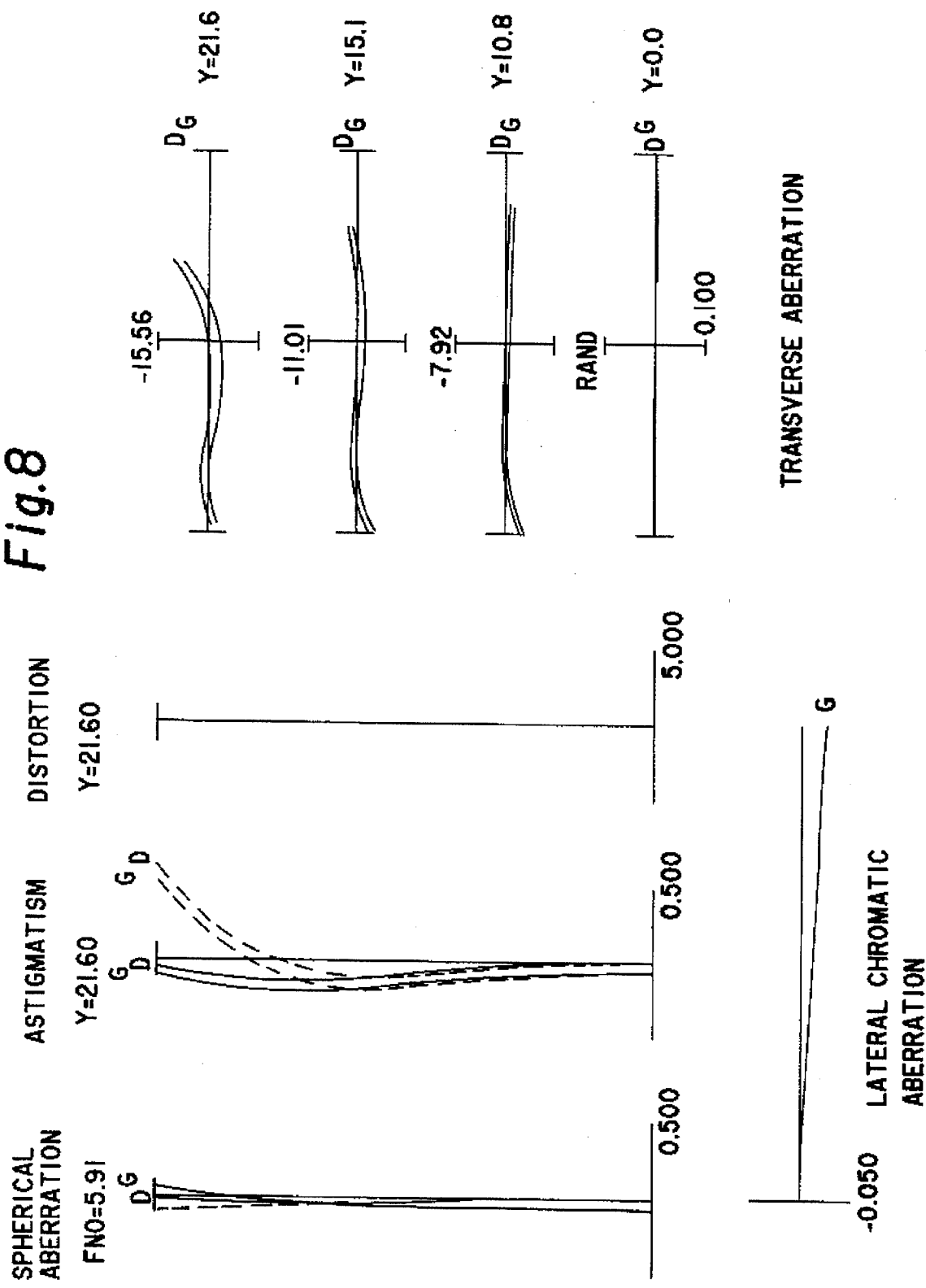
FIG. 8 graphically shows various aberrations at the tele end in Example 2.

FIGS. 6 to 8 graphically show various aberrations in Example 2: FIG. 6 shows various aberrations at the wide end; FIG. 7 shows various aberrations at a middle focal length position; and FIG. 8 shows various aberrations at the tele end.

In these figures, $F_{NO}$ is F-number, Y is the image height, D is the d-line (λ=587.6 nm), and G is the g-line (λ=435.8 nm). In the graphs showing astigmatism, the solid line shows a sagittal image surface, and the broken line shows a meridional image surface. In the graphs showing spherical aberration, the broken line shows the sine condition.

It will be clearly understood from these figures that the zoom lens system in this example is favorably corrected for various aberrations at each focal length position.

EXAMPLE 3

Figure 9:
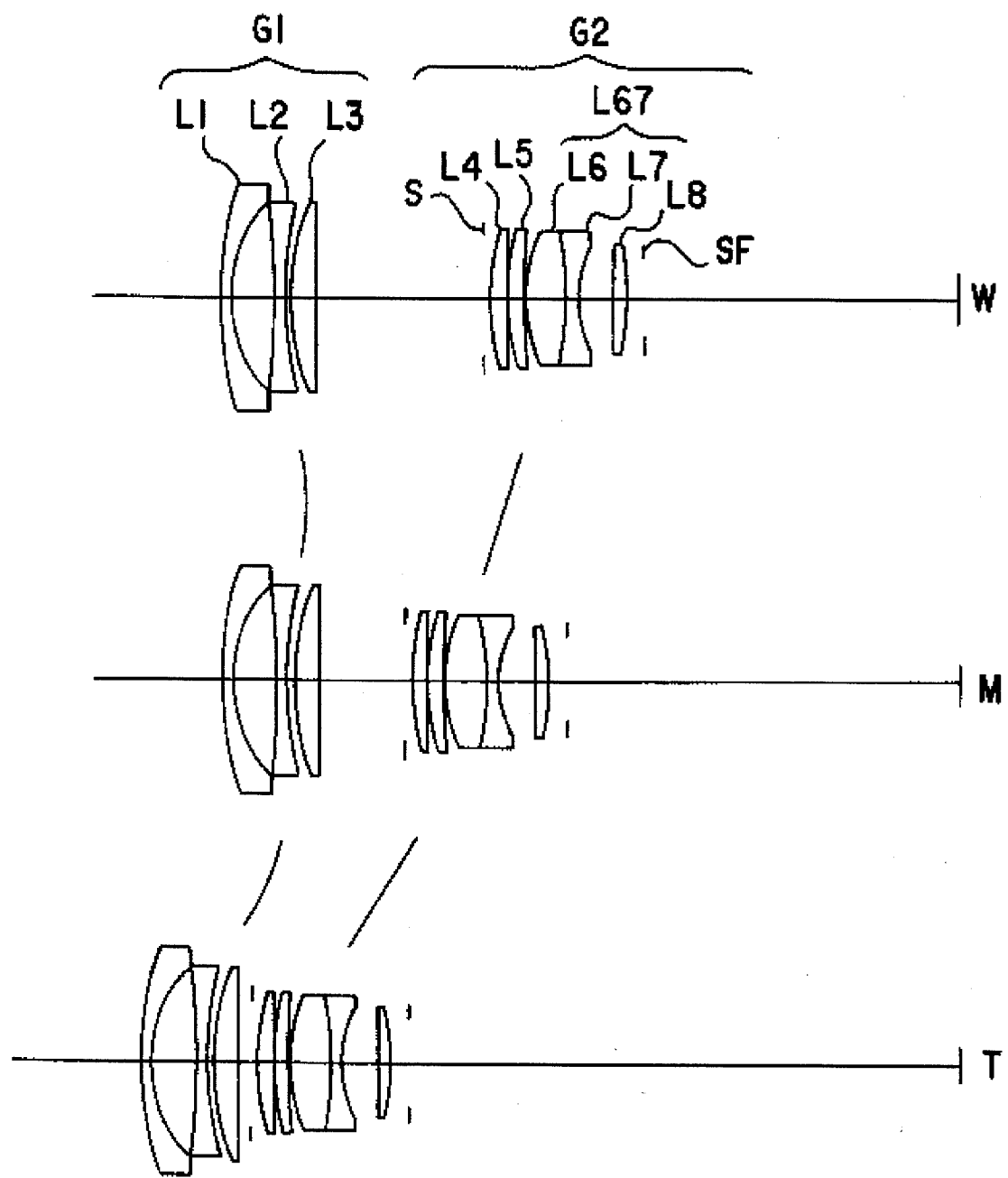
FIG. 9 shows the lens arrangement of a zoom lens system according to a third embodiment of the present invention, together with the movement of each lens unit during zooming.

FIG. 9 shows the lens arrangement of a zoom lens system according to a third embodiment of the present invention, together with the movement of each lens unit during zooming. It should be noted that, in FIG. 9, W denotes the wide end, M a middle focal length position, and T the tele end.

The zoom lens system shown in FIG. 9 has, in order from the object side, a first lens unit G1, and a second lens unit G2. The first lens unit G1 has, in order from the object side, a negative meniscus lens element L1 having a convex surface directed toward the object side, a biconcave lens element L2 in which the absolute value of the curvature radius of the image-side surface is smaller than that of the object-side surface, and a biconvex lens element L3 in which the curvature radius of the object-side surface is smaller than that of the image-side surface. The second lens unit G2 has, in order from the object side, a positive meniscus lens element L4 having a convex surface directed toward the object side, a positive meniscus lens element L5 having a convex surface directed toward the object side, a negative cemented meniscus lens element L67 composed of a biconvex lens element L6 and a biconcave lens element L7, which are cemented together, and a biconvex lens element L8 in which the curvature radius of the image-side surface is smaller than that of the object-side surface.

Table 3 below shows numerical data in Example 3 of the present invention. In Table 3, reference symbol f denotes the focal length, $F_{NO}$ is F-number, and 2ω is the angle of view. Further, the surface Nos. are put as ordinal Nos. of the lens surfaces from the object side, and the refractive indices and the Abbe's numbers are values for the spectral d-line (λ=587.6 nm).

TABLE 3 f = from 36 to 77.6 mm
$F_{NO}$ = from 4.1 to 5.9
2ω = from 65 to 31.2°

| Surface No. | Curvature radius | Surface separation | Abbe's number | Refractive index |
|---|---|---|---|---|
| 1 | 44.440 | 1.60 | 40.9 | 1.79631 |
| 2 | 18.116 | 7.00 | | |
| 3 | −87.699 | 1.50 | 46.5 | 1.80411 |
| 4 | 47.209 | 1.05 | | |
| 5 | 33.197 | 4.20 | 28.6 | 1.79504 |
| 6 | −339.433 | (d6 = variable) | | |
| 7 | 28.265 | 2.50 | 60.1 | 1.62041 |
| 8 | 91.597 | 0.10 | | |
| 9 | 29.316 | 2.50 | 55.6 | 1.69680 |
| 10 | 108.300 | 0.10 | | |
| 11 | 21.553 | 6.35 | 65.7 | 1.46450 |
| 12 | −51.079 | 1.80 | 33.9 | 1.80384 |
| 13 | 15.757 | 5.40 | | |
| 14 | 175.974 | 2.10 | 50.2 | 1.72000 |
| 15 | −41.107 | 3.00 | | |
| 16 | ∞ | (d16 = variable) | | (fixed stop SF) |

(Spacings which are variable during zooming)

| f | 36.0000 | 50.0000 | 77.6000 |
|---|---|---|---|
| d6 | 26.3978 | 13.8897 | 2.4500 |
| d16 | 48.0732 | 60.2499 | 84.2554 |

(Values corresponding to the conditions)

| (1) $|f1|/(fw \cdot ft)^{1/2}$ = | 0.814 |
|---|---|
| (2) q2 = | −0.30 |
| (3) f2/|f1| = | 0.870 |
| (4) d78/fw = | 0.150 |
| (5) q3 = | 0.82 |
| (6) q8 = | −0.62 |
| (7) n1 = | 1.796 |
| (7) n2 = | 1.804 |
| (8) d7/d67 = | 0.221 |
| (9) Nn−Np = | 0.339 |
| (10) vdp−vdn = | 31.9 |

Figure 10:
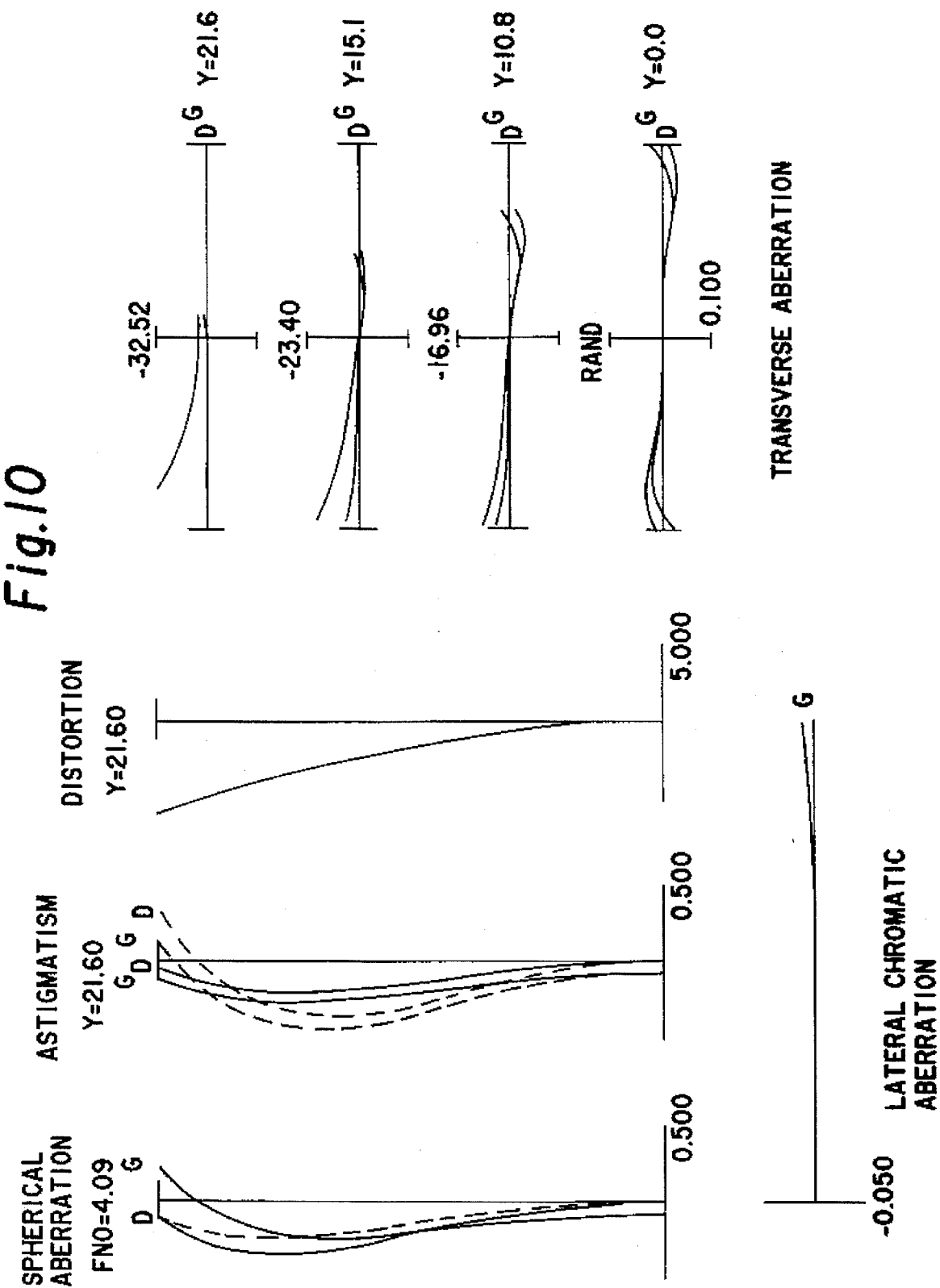
FIG. 10 graphically shows various aberrations at the wide end in Example 3.
Figure 11:
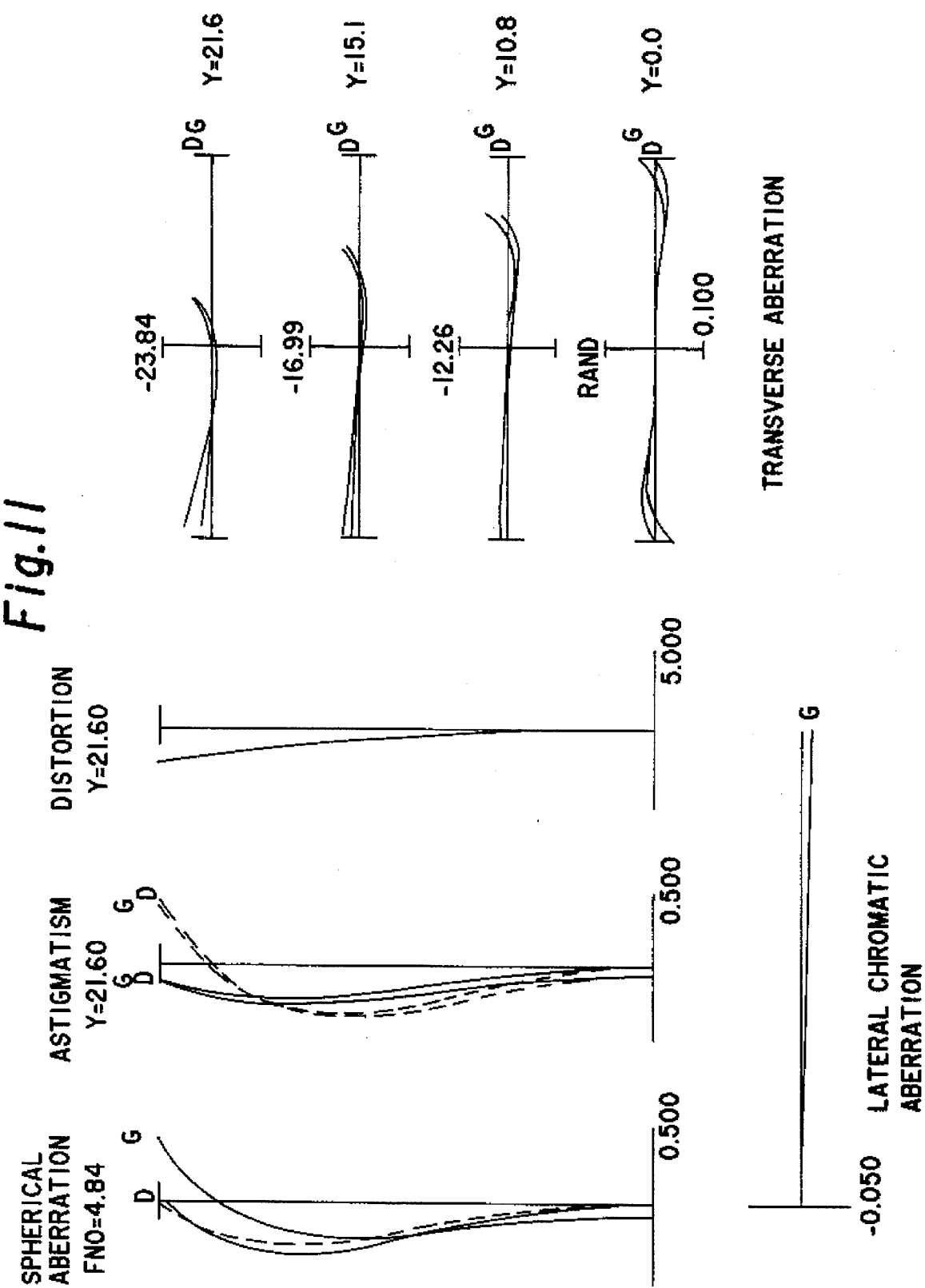
FIG. 11 graphically shows various aberrations at a middle focal length position in Example 3.
Figure 12:
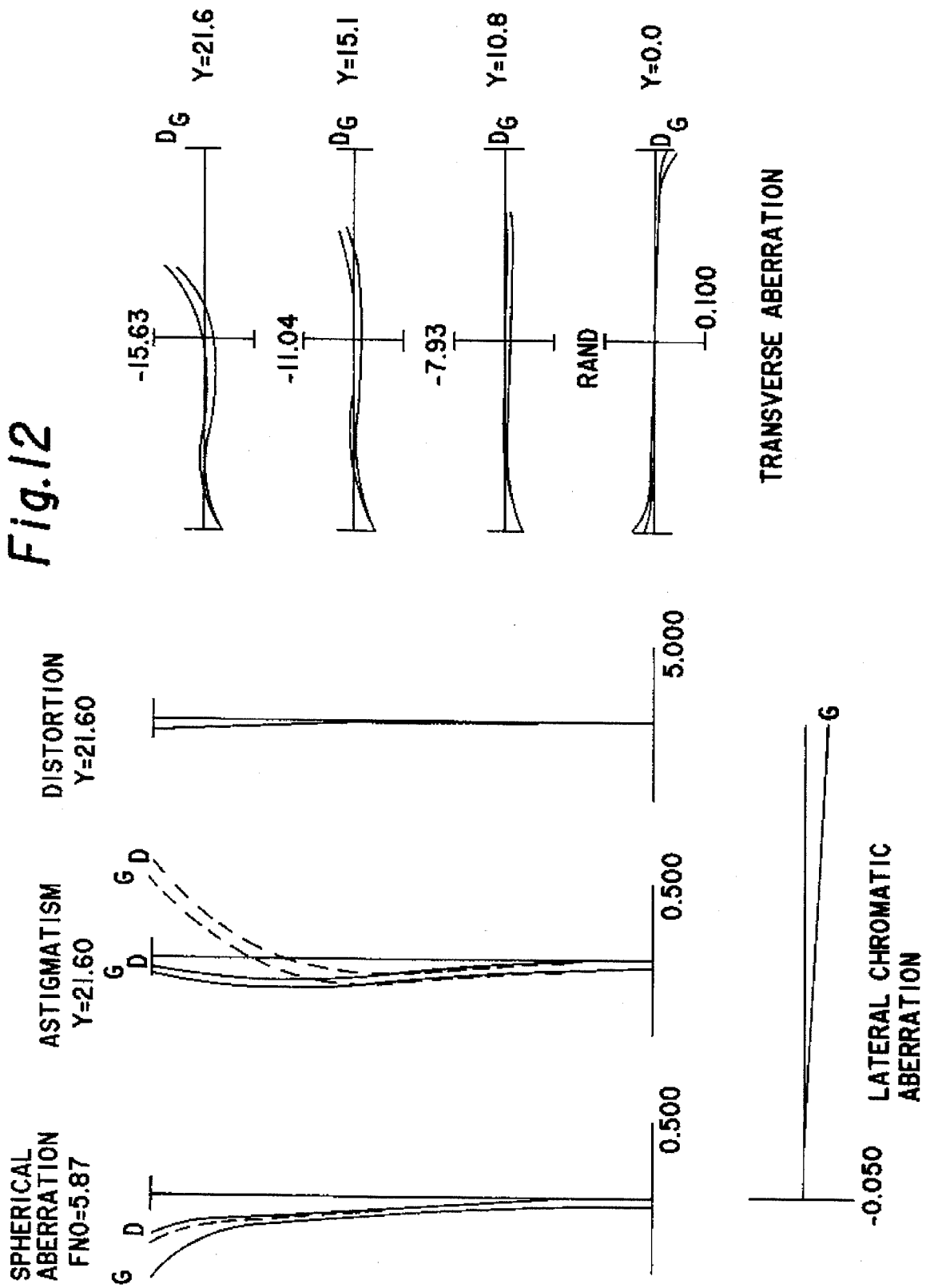
FIG. 12 graphically shows various aberrations at the tele end in Example 3.

FIGS. 10 to 12 graphically show various aberrations in Example 3: FIG. 10 shows various aberrations at the wide end; FIG. 11 shows various aberrations at a middle focal length position; and FIG. 12 shows various aberrations at the tele end.

In these figures, $F_{NO}$ is F-number, Y is the image height, D is the d-line (λ=587.6 nm), and G is the g-line (λ=435.8 nm).

In the graphs showing astigmatism, the solid line shows a sagittal image surface, and the broken line shows a meridional image surface. In the graphs showing spherical aberration, the broken line shows the sine condition.

It will be clearly understood from these figures that the zoom lens system in this example is favorably corrected for various aberrations at each focal length position.

Next, Examples 4 to 6 according to another aspect of the present invention, which are different in the basic lens arrangement from the above-described Examples 1 to 3, will be explained.

EXAMPLE 4

Figure 13:
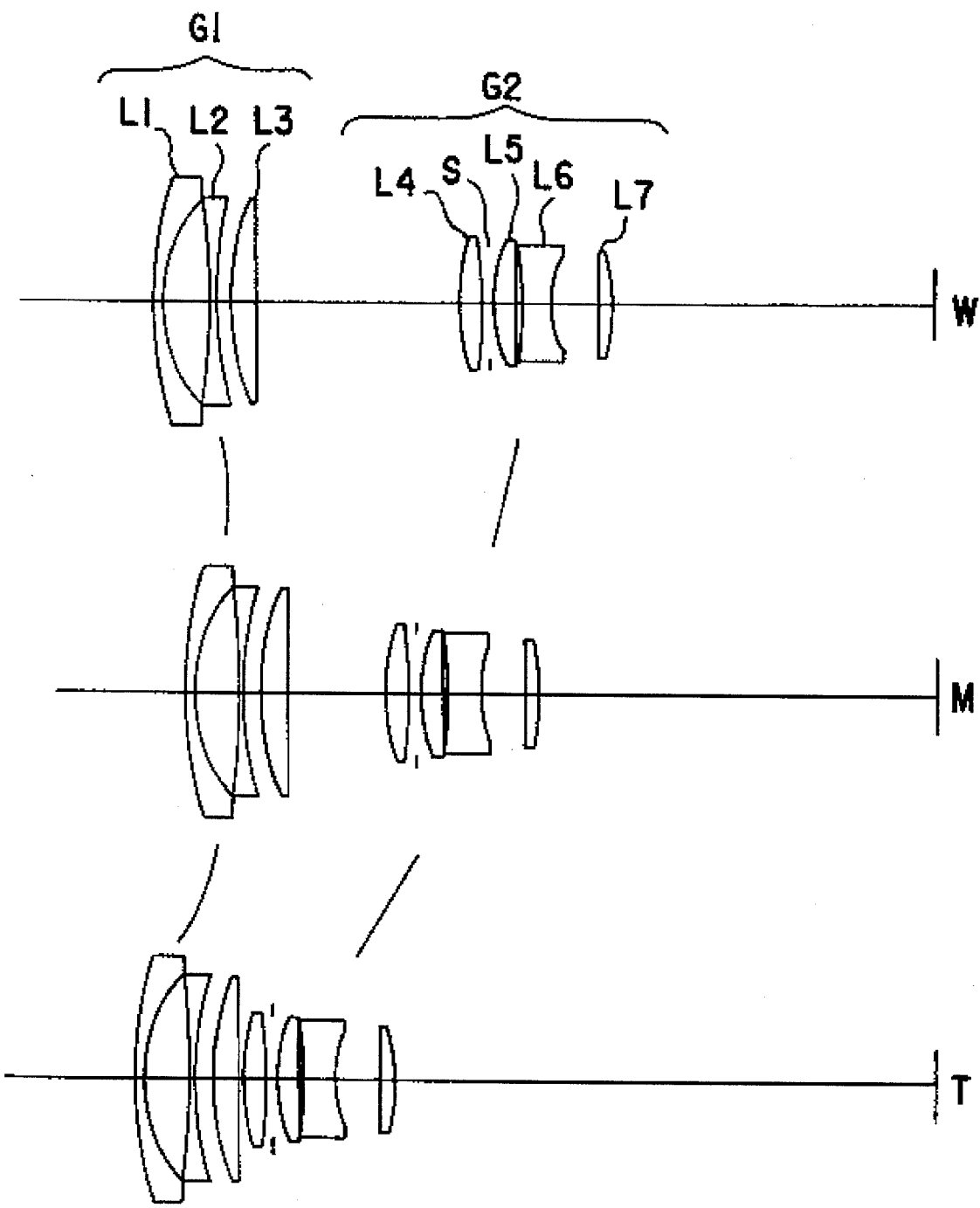
FIG. 13 shows the lens arrangement of a zoom lens system according to a fourth embodiment of the present invention, together with the movement of each lens unit during zooming.

FIG. 13 shows the lens arrangement of a zoom lens system according to a fourth embodiment of the present invention, together with the movement of each lens unit during zooming. It should be noted that, in FIG. 13, W denotes the wide end, M a middle focal length position, and T the tele end.

The zoom lens system shown in FIG. 13 has, in order from the object side, a first lens unit G1, and a second lens unit G2. The first lens unit G1 has, in order from the object side, a negative meniscus lens element L1 having a convex surface directed toward the object side, a biconcave lens element L2 in which the absolute value of the curvature radius of the image-side surface is smaller than that of the object-side surface, and a positive meniscus lens element L3 having a convex surface directed toward the object side. The second lens unit G2 has, in order from the object side, a biconvex lens element L4 in which the curvature radius of the object-side surface is smaller than that of the image-side surface, a positive meniscus lens element L5 having a convex surface directed toward the object side, a biconcave lens element L6 in which the absolute value of the curvature radius of the image-side surface is smaller than that of the object-side surface, and a positive meniscus lens element L7 having a convex surface directed toward the image side.

Table 4 below shows numerical data in Example 4 of the present invention. In Table 4, reference symbol f denotes the focal length, $F_{NO}$ is F-number, and $2\omega$ is the angle of view. Further, the surface Nos. are put as ordinal Nos. of the lens surfaces from the object side, and the refractive indices and the Abbe's numbers are values for the spectral d-line ($\lambda$=587.6 nm).

TABLE 4 f = from 36 to 77.6 mm
$F_{NO}$ = from 4.1 to 5.9
$2\omega$ = from 64.4 to 31.1°

| Surface No. | Curvature radius | Surface separation | Abbe's number | Refractive index |
|---|---|---|---|---|
| 1 | 54.504 | 1.60 | 45.4 | 1.79668 |
| 2 | 20.584 | 6.00 | | |
| 3 | −225.853 | 1.50 | 45.4 | 1.79668 |
| 4 | 55.514 | 2.50 | | |
| 5 | 36.116 | 3.50 | 28.6 | 1.79504 |
| 6 | 296.584 | (d6 = variable) | | |
| 7 | 27.379 | 3.10 | 60.1 | 1.62041 |
| 8 | −94.233 | 2.00 | | |
| 9 | 20.546 | 3.30 | 61.0 | 1.58913 |
| 10 | 628.497 | 0.60 | | |
| 11 | −79.405 | 5.00 | 33.9 | 1.80384 |
| 12 | 16.613 | 6.90 | | |
| 13 | −330.303 | 2.00 | 60.1 | 1.62041 |
| 14 | −31.289 | (d14 = variable) | | |

TABLE 4-continued

| (Spacings which are variable during zooming) | | | |
|---|---|---|---|
| f | 36.0000 | 50.0000 | 77.6000 |
| d6 | 31.1548 | 15.4265 | 1.0417 |
| d14 | 48.2356 | 59.3130 | 81.1517 |

(Values corresponding to the conditions)

(1) $|f1|/(fw \cdot ft)^{1/2}$ = 0.96
(2) q2 = −0.61
(3) d4/dI = 0.166
(4) f2/|f1| = 0.79
(5) f11/f12 = 0.76
(6) r10 = 628.5
(7) d12/dII = 0.301

Figure 14:
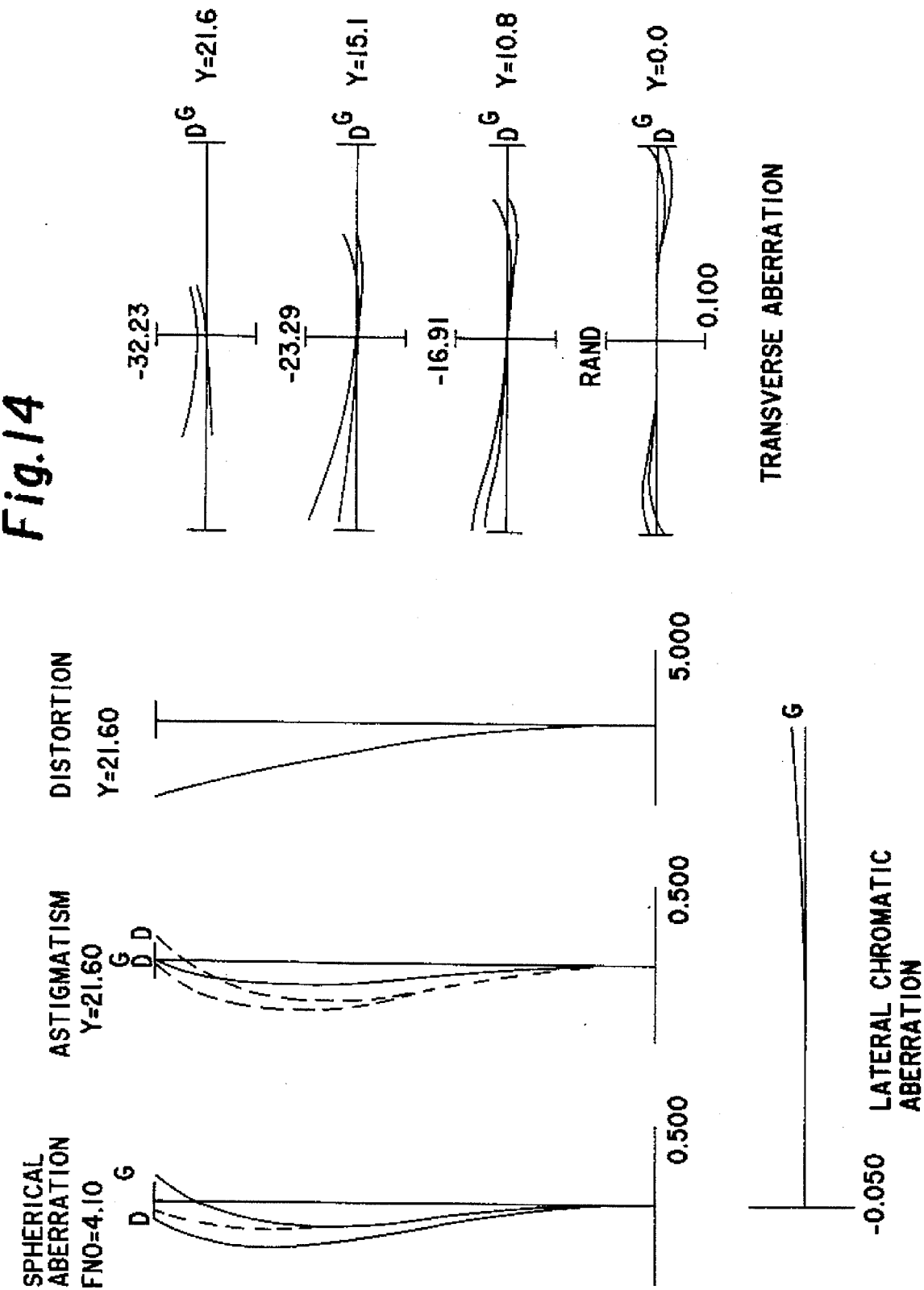
FIG. 14 graphically shows various aberrations at the wide end in Example 4.
Figure 15:
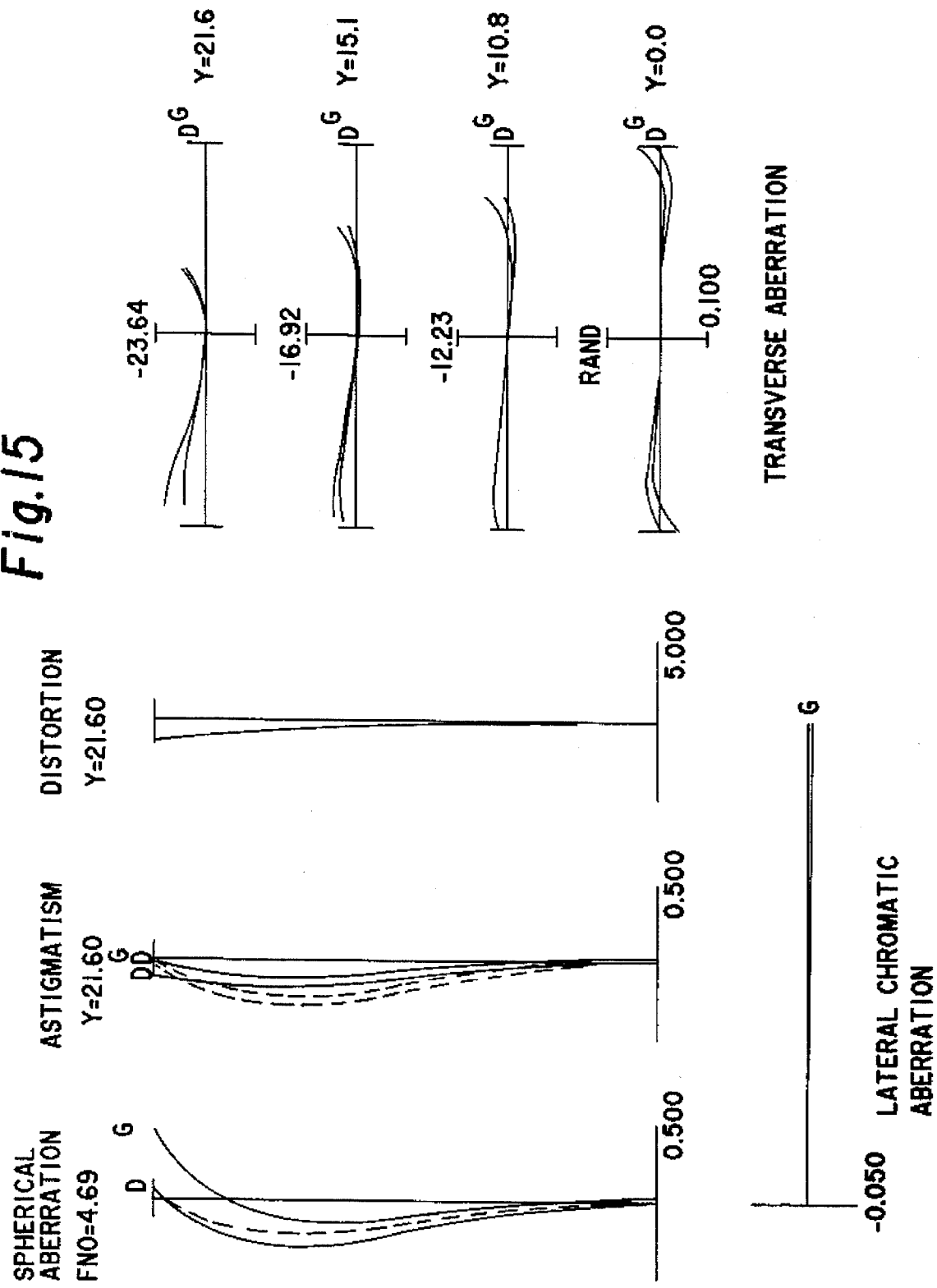
FIG. 15 graphically shows various aberrations at a middle focal length position in Example 4.
Figure 16:
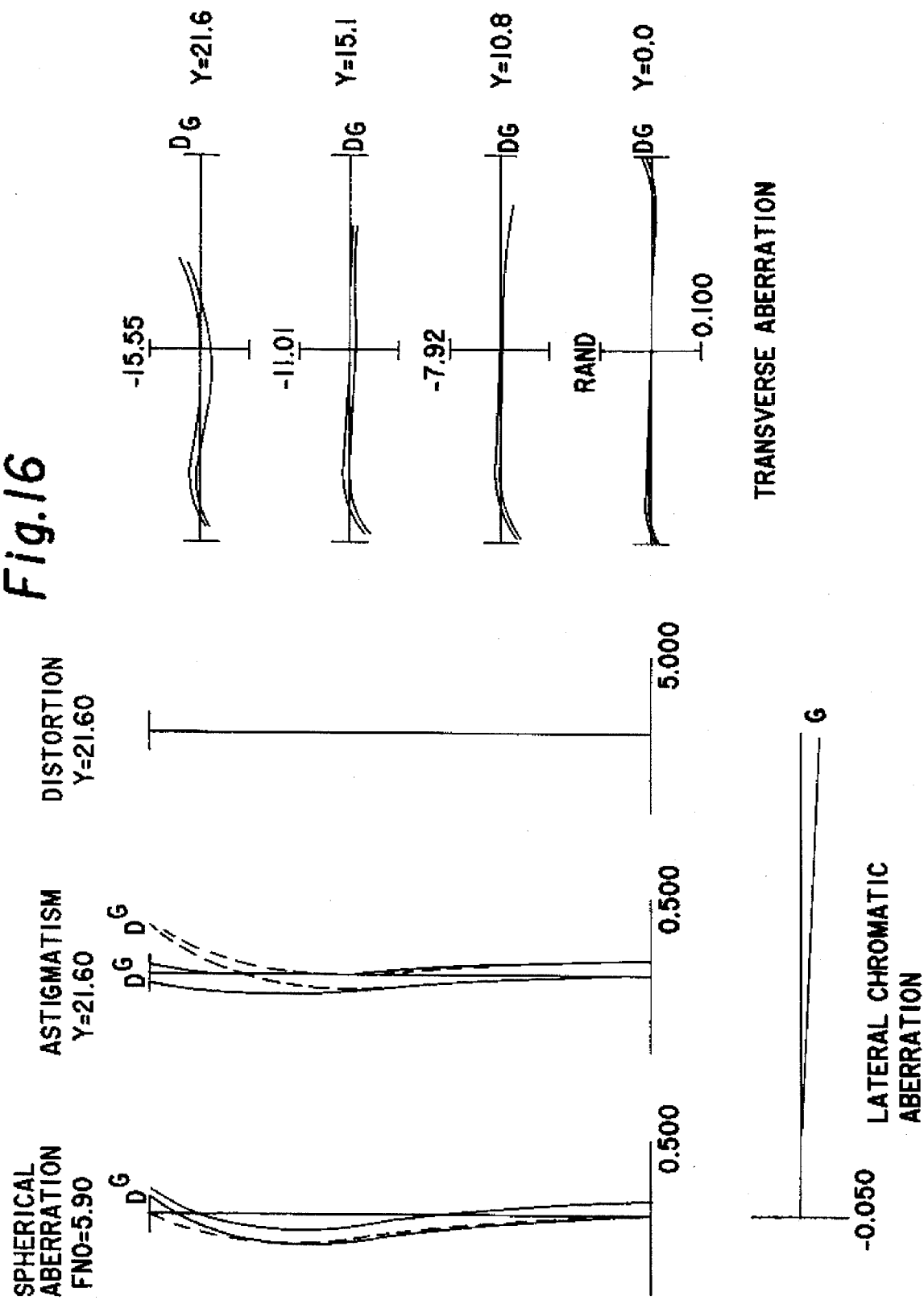
FIG. 16 graphically shows various aberrations at the tele end in Example 4.

FIGS. 14 to 16 graphically show various aberrations in Example 4: FIG. 14 shows various aberrations at the wide end; FIG. 15 shows various aberrations at a middle focal length position; and FIG. 16 shows various aberrations at the tele end.

In these figures, $F_{NO}$ is F-number, Y is the image height, D is the d-line ($\lambda$=587.6 nm), and G is the g-line ($\lambda$=435.8 nm).

In the graphs showing astigmatism, the solid line shows a sagittal image surface, and the broken line shows a meridional image surface. In the graphs showing spherical aberration, the broken line shows the sine condition.

It will be clearly understood from these figures that the zoom lens system in this example is favorably corrected for various aberrations at each focal length position.

EXAMPLE 5

Figure 17:
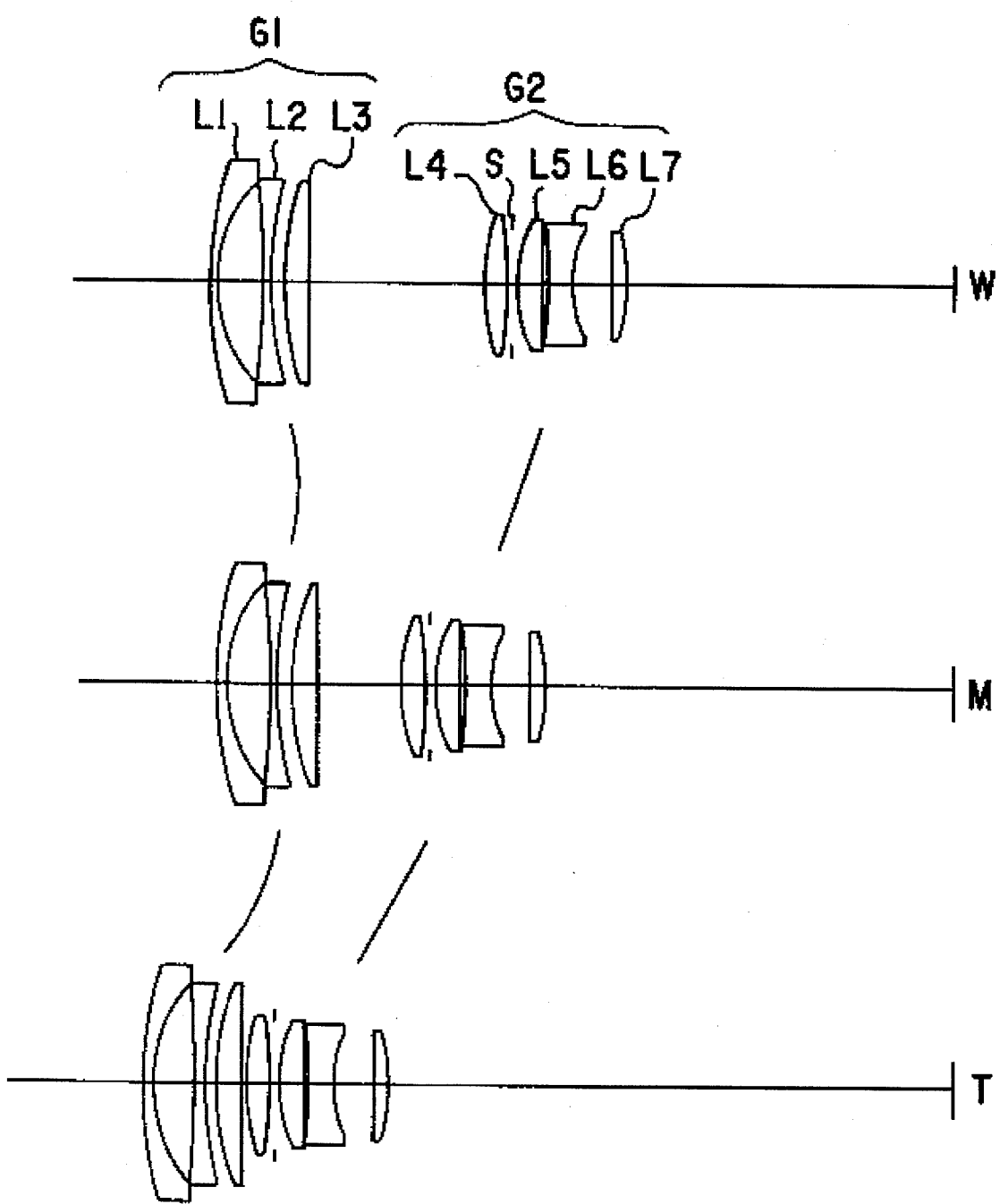
FIG. 17 shows the lens arrangement of a zoom lens system according to a fifth embodiment of the present invention, together with the movement of each lens unit during zooming.

FIG. 17 shows the lens arrangement of a zoom lens system according to a fifth embodiment of the present invention, together with the movement of each lens unit during zooming. It should be noted that, in FIG. 17, W denotes the wide end, M a middle focal length position, and T the tele end.

The zoom lens system shown in FIG. 17 has, in order from the object side, a first lens unit G1, and a second lens unit G2. The first lens unit G1 has, in order from the object side, a negative meniscus lens element L1 having a convex surface directed toward the object side, a biconcave lens element L2 in which the absolute value of the curvature radius of the image-side surface is smaller than that of the object-side surface, and a positive meniscus lens element L3 having a convex surface directed toward the object side. The second lens unit G2 has, in order from the object side, a biconvex lens element L4 in which the curvature radius of the object-side surface is smaller than that of the image-side surface, a positive meniscus lens element L5 having a convex surface directed toward the object side, a biconcave lens element L6 in which the absolute value of the curvature radius of the image-side surface is smaller than that of the object-side surface, and a positive meniscus lens element L7 having a convex surface directed toward the image side.

Table 5 below shows numerical data in Example 5 of the present invention. In Table 5, reference symbol f denotes the focal length, $F_{NO}$ is F-number, and $2\omega$ is the angle of view. Further, the surface Nos. are put as ordinal Nos. of the lens surfaces from the object side, and the refractive indices and the Abbe's numbers are values for the spectral d-line ($\lambda$=587.6 nm).

TABLE 5 f = from 36 to 77.6 mm
$F_{NO}$ = from 4.1 to 5.94
2ω = from 64.3 to 31.1°

| Surface No. | Curvature radius | Surface separation | Abbe's number | Refractive index |
|---|---|---|---|---|
| 1 | 48.750 | 1.60 | 45.4 | 1.79668 |
| 2 | 18.570 | 6.00 | | |
| 3 | −198.590 | 1.50 | 45.4 | 1.79668 |
| 4 | 49.752 | 1.80 | | |
| 5 | 32.337 | 3.50 | 28.6 | 1.79504 |
| 6 | 264.002 | (d6 = variable) | | |
| 7 | 25.468 | 3.10 | 60.1 | 1.62041 |
| 8 | −95.801 | 1.80 | | |
| 9 | 18.850 | 3.50 | 61.0 | 1.58913 |
| 10 | 317.323 | 0.70 | | |
| 11 | −76.224 | 3.70 | 33.9 | 1.80384 |
| 12 | 15.610 | 5.90 | | |
| 13 | −436.925 | 2.00 | 60.1 | 1.62041 |
| 14 | −29.606 | (d14 = variable) | | |

(Spacings which are variable during zooming)

| f | 36.0000 | 50.0000 | 77.6000 |
|---|---|---|---|
| d6 | 25.7478 | 12.7973 | 0.9535 |
| d14 | 48.3308 | 59.8423 | 82.5360 |

(Values corresponding to the conditions)

(1) $|f1|/(fw \cdot ft)^{1/2}$ = 0.85
(2) q2 = −0.60
(3) d4/dI = 0.125
(4) f2/|f1| = 0.82
(5) f11/f12 = 0.77
(6) r10 = 317.3
(7) d12/dII = 0.285

Figure 19:
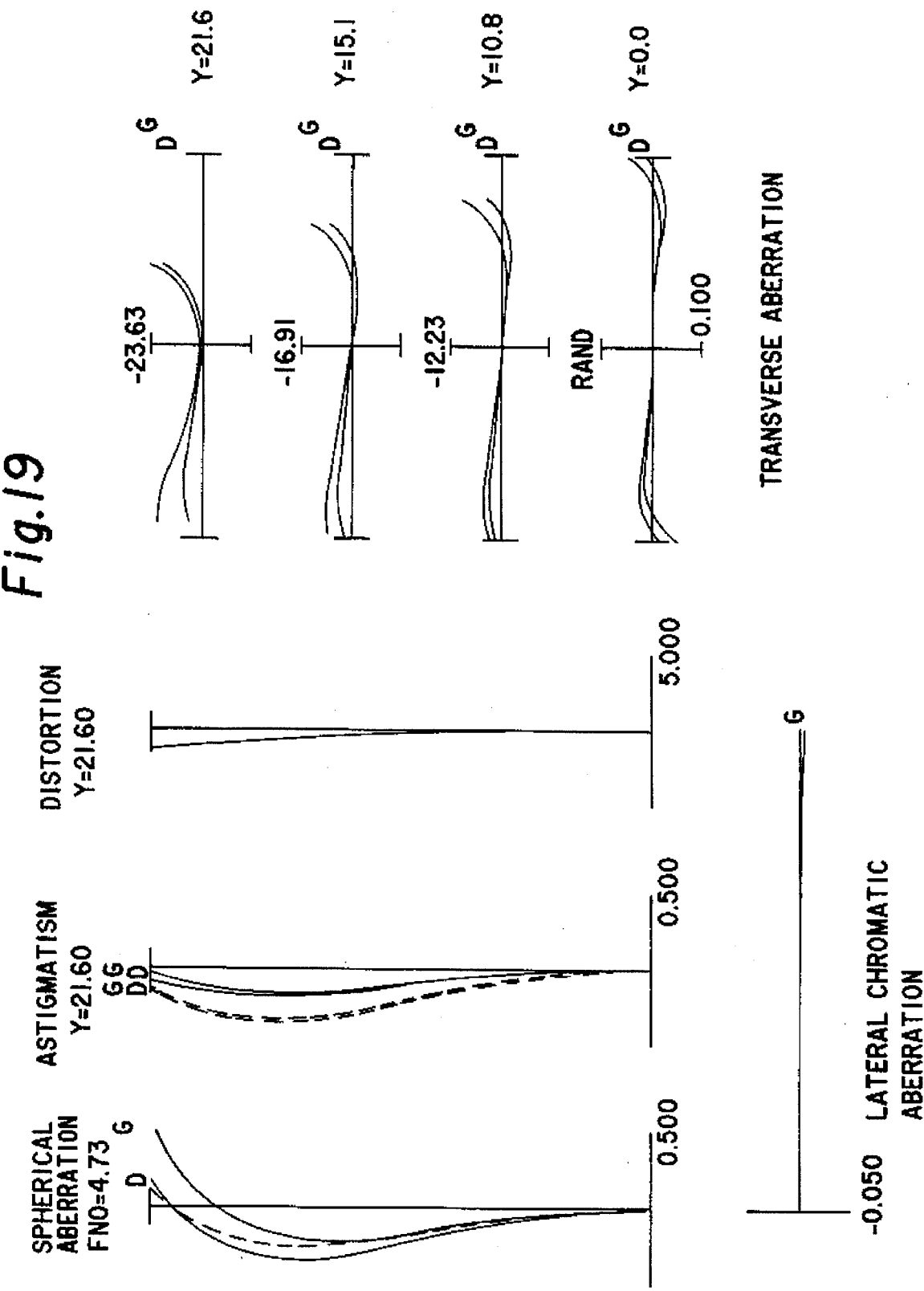
FIG. 19 graphically shows various aberrations at a middle focal length position in Example 5.
Figure 20:
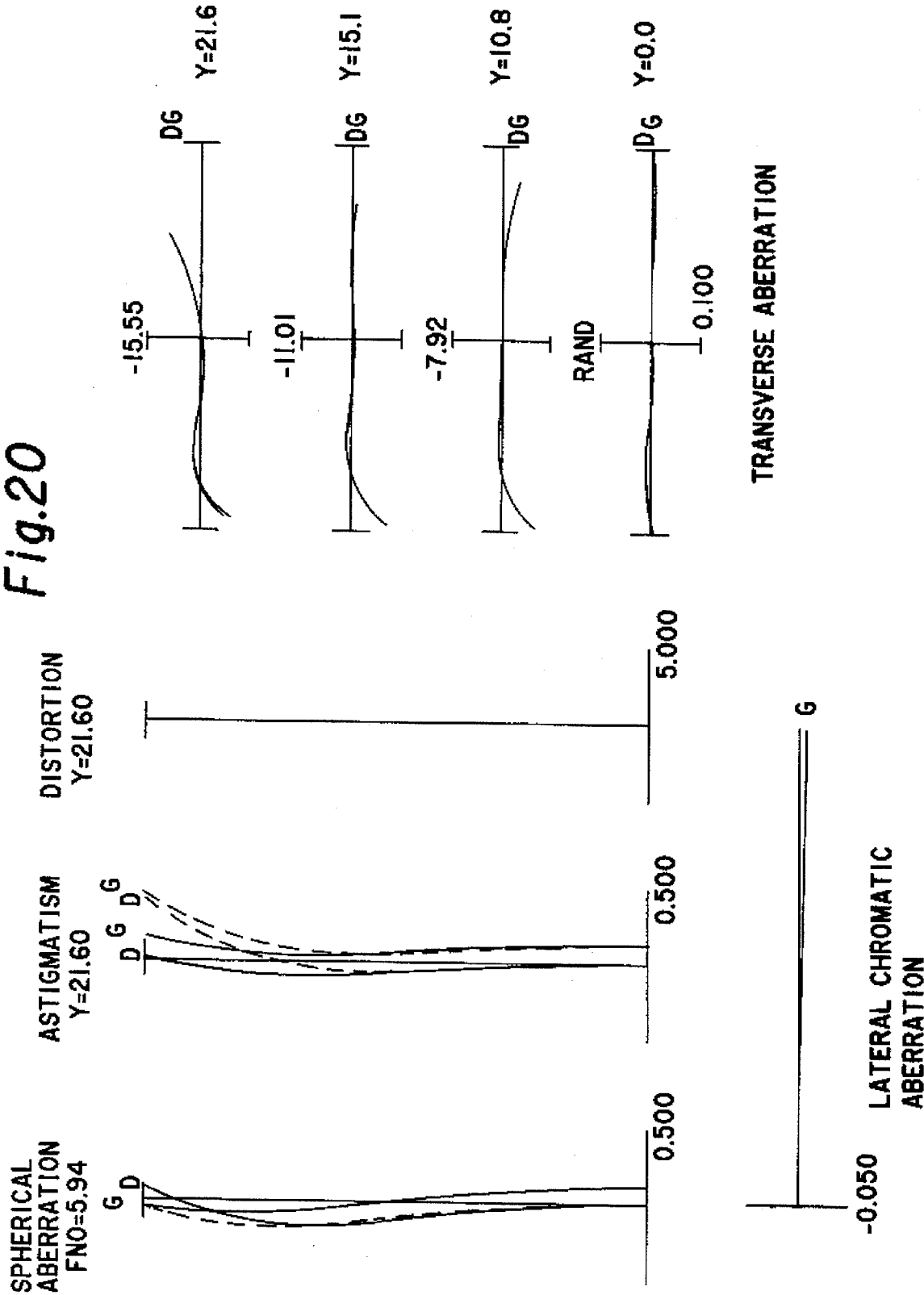
FIG. 20 graphically shows various aberrations at the tele end in Example 5.

FIGS. 18 to 20 graphically show various aberrations in Example 5: FIG. 18 shows various aberrations at the wide end; FIG. 19 shows various aberrations at a middle focal length position; and FIG. 20 shows various aberrations at the tele end.

In these figures, $F_{NO}$ is F-number, Y is the image height, D is the d-line (λ=587.6 nm), and G is the g-line (λ=435.8 nm). In the graphs showing astigmatism, the solid line shows a sagittal image surface, and the broken line shows a meridional image surface. In the graphs showing spherical aberration, the broken line shows the sine condition.

It will be clearly understood from these figures that the zoom lens system in this example is favorably corrected for various aberrations at each focal length position.

EXAMPLE 6

Figure 21:
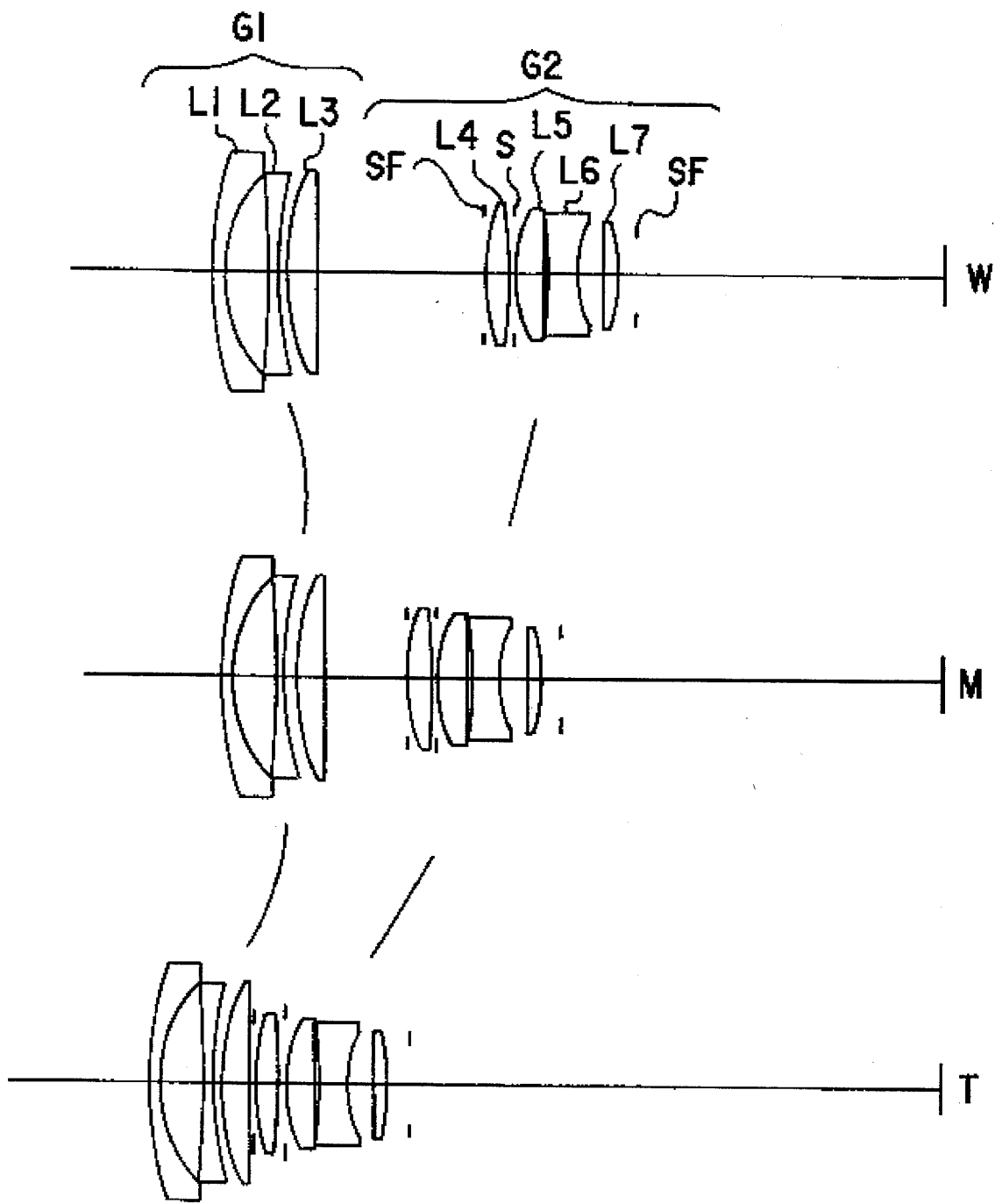
FIG. 21 shows the lens arrangement of a zoom lens system according to a sixth embodiment of the present invention, together with the movement of each lens unit during zooming.

FIG. 21 shows the lens arrangement of a zoom lens system according to a sixth embodiment of the present invention, together with the movement of each lens unit during zooming. It should be noted that, in FIG. 21, W denotes the wide end, M a middle focal length position, and T the tele end.

The zoom lens system shown in FIG. 21 has, in order from the object side, a first lens unit G1, and a second lens unit G2. The first lens unit G1 has, in order from the object side, a negative meniscus lens element L1 having a convex surface directed toward the object side, a biconcave lens element L2 in which the absolute value of the curvature radius of the image-side surface is smaller than that of the object-side surface, and a positive meniscus lens element L3 having a convex surface directed toward the object side. The second lens unit G2 has, in order from the object side, a biconvex lens element L4 in which the curvature radius of the object-side surface is smaller than that of the image-side surface, a positive meniscus lens element L5 having a convex surface directed toward the object side, a biconcave lens element L6 in which the absolute value of the curvature radius of the image-side surface is smaller than that of the object-side surface, and a biconvex lens element L7 in which the curvature radius of the image-side surface is smaller than that of the object-side surface.

Table 6 below shows numerical data in Example 6 of the present invention. In Table 6, reference symbol f denotes the focal length, $F_{NO}$ is F-number, and 2ω is the angle of view. Further, the surface Nos. are put as ordinal Nos. of the lens surfaces from the object side, and the refractive indices and the Abbe's numbers are values for the spectral d-line (λ=587.6 nm).

TABLE 6 f = from 36 to 77.6 mm
$F_{NO}$ = from 4.1 to 5.9
2ω = from 64 to 31°

| Surface No. | Curvature radius | Surface separation | Abbe's number | Refractive index |
|---|---|---|---|---|
| 1 | 49.349 | 1.60 | 43.3 | 1.84042 |
| 2 | 18.462 | 6.00 | | |
| 3 | −225.999 | 1.50 | 40.9 | 1.79631 |
| 4 | 52.055 | 1.30 | | |
| 5 | 31.340 | 3.80 | 28.6 | 1.79504 |
| 6 | 264.001 | (d6 = variable) | | |
| 7 | ∞ | 0.00 | | (fixed stop SF) |
| 8 | 24.089 | 3.30 | 57.0 | 1.62280 |
| 9 | −91.328 | 1.10 | | |
| 10 | 18.442 | 3.80 | 61.0 | 1.58913 |
| 11 | 136.206 | 0.70 | | |
| 12 | −77.482 | 4.20 | 33.9 | 1.80384 |
| 13 | 14.876 | 3.80 | | |
| 14 | 362.115 | 2.00 | 59.0 | 1.51823 |
| 15 | −26.778 | 3.00 | | |
| 16 | ∞ | (d16 = variable) | | (fixed stop SF) |

(Spacings which are variable during zooming)

| f | 36.0000 | 50.0000 | 77.6000 |
|---|---|---|---|
| d6 | 24.3228 | 12.0723 | 0.8687 |
| d16 | 42.9869 | 53.8750 | 75.3392 |

(Values corresponding to the conditions)

(1) $|f1|/(fw \cdot ft)^{1/2}$ = 0.85
(2) q2 = −0.63
(3) d4/dI = 0.092
(4) f2/|f1| = 0.778
(5) f11/f12 = 0.678
(6) r10 = 136.21
(7) d12/dII = 0.201

Figure 22:
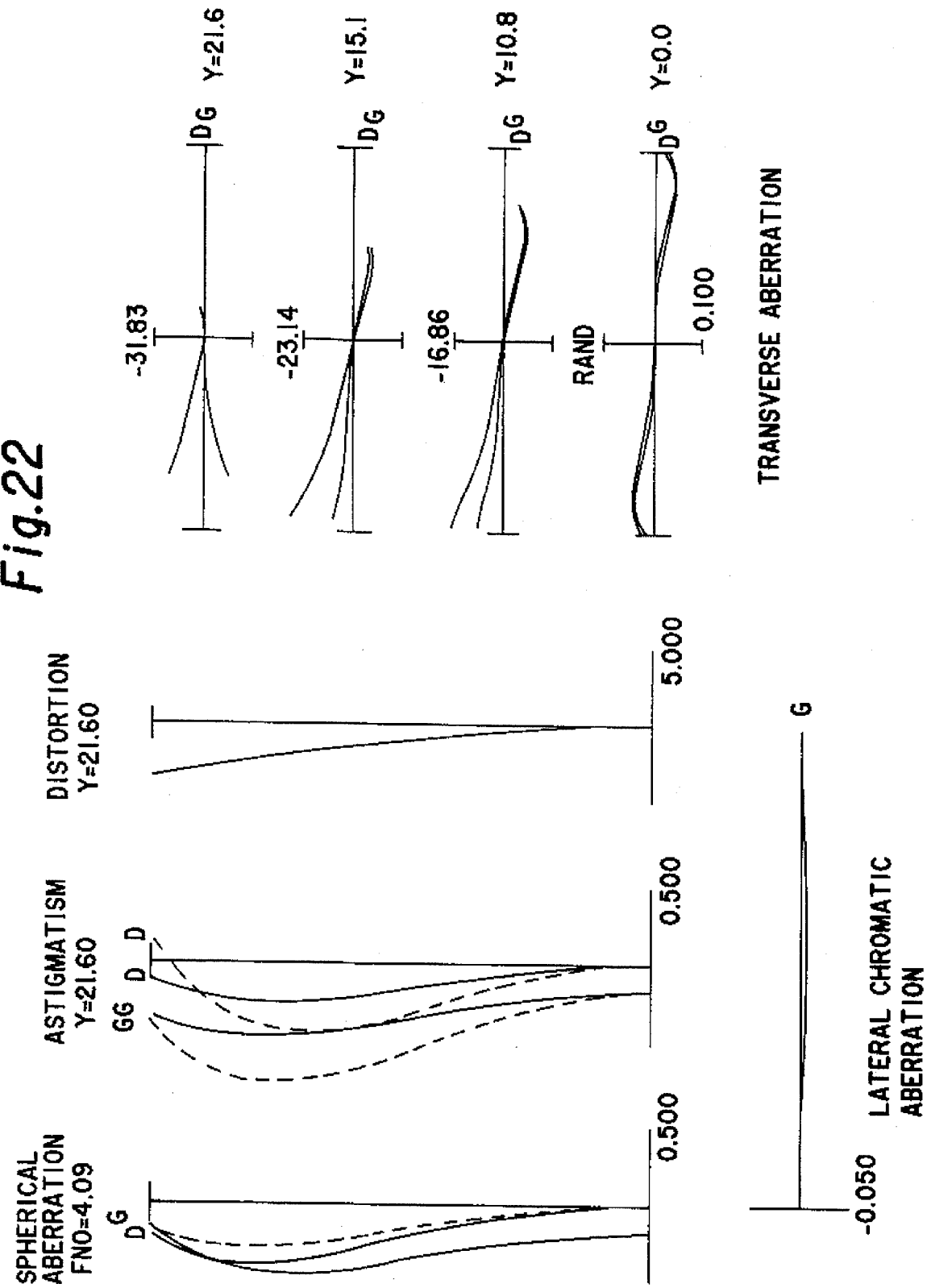
FIG. 22 graphically shows various aberrations at the wide end in Example 6.
Figure 23:
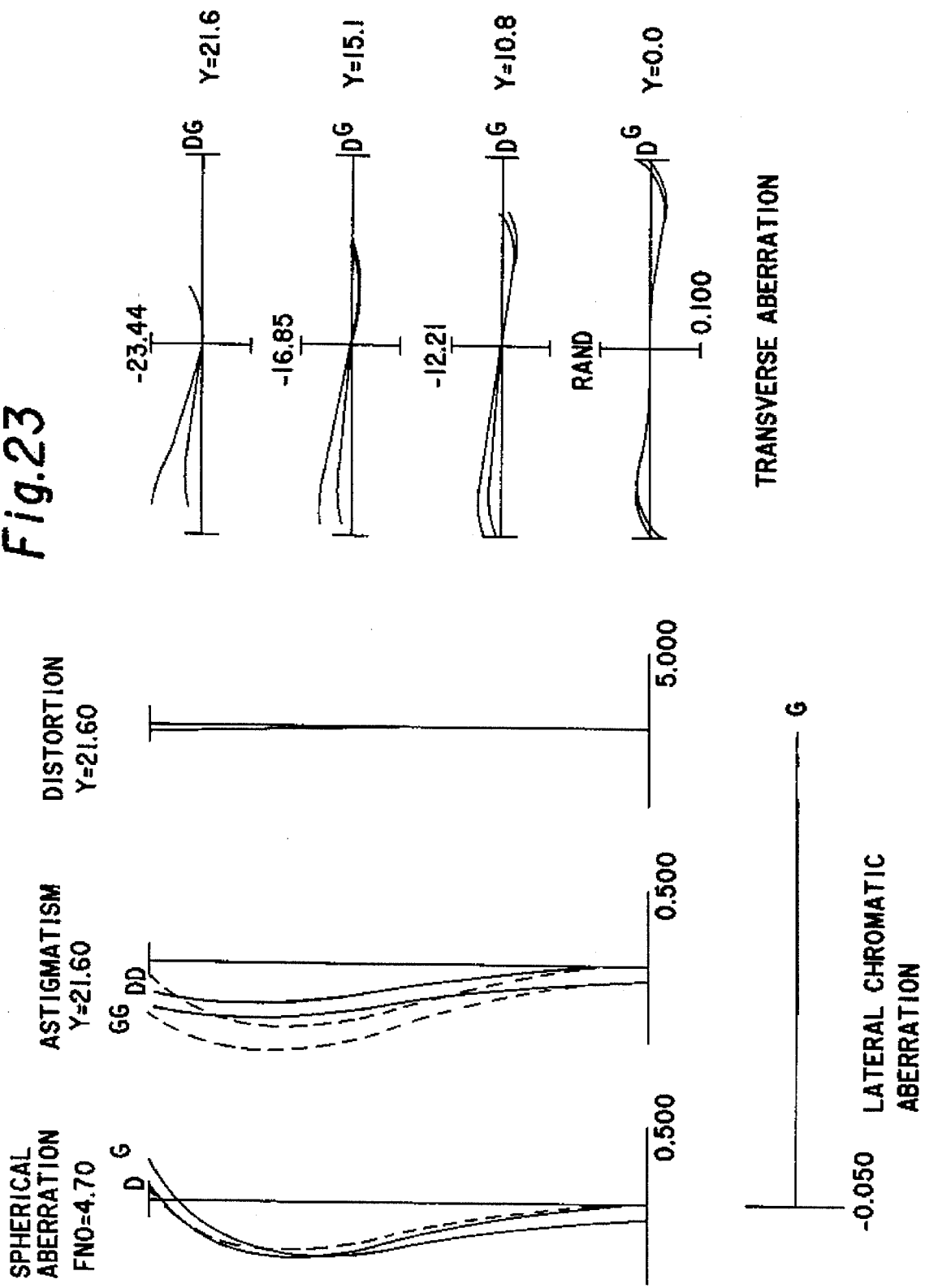
FIG. 23 graphically shows various aberrations at a middle focal length position in Example 6.
Figure 24:
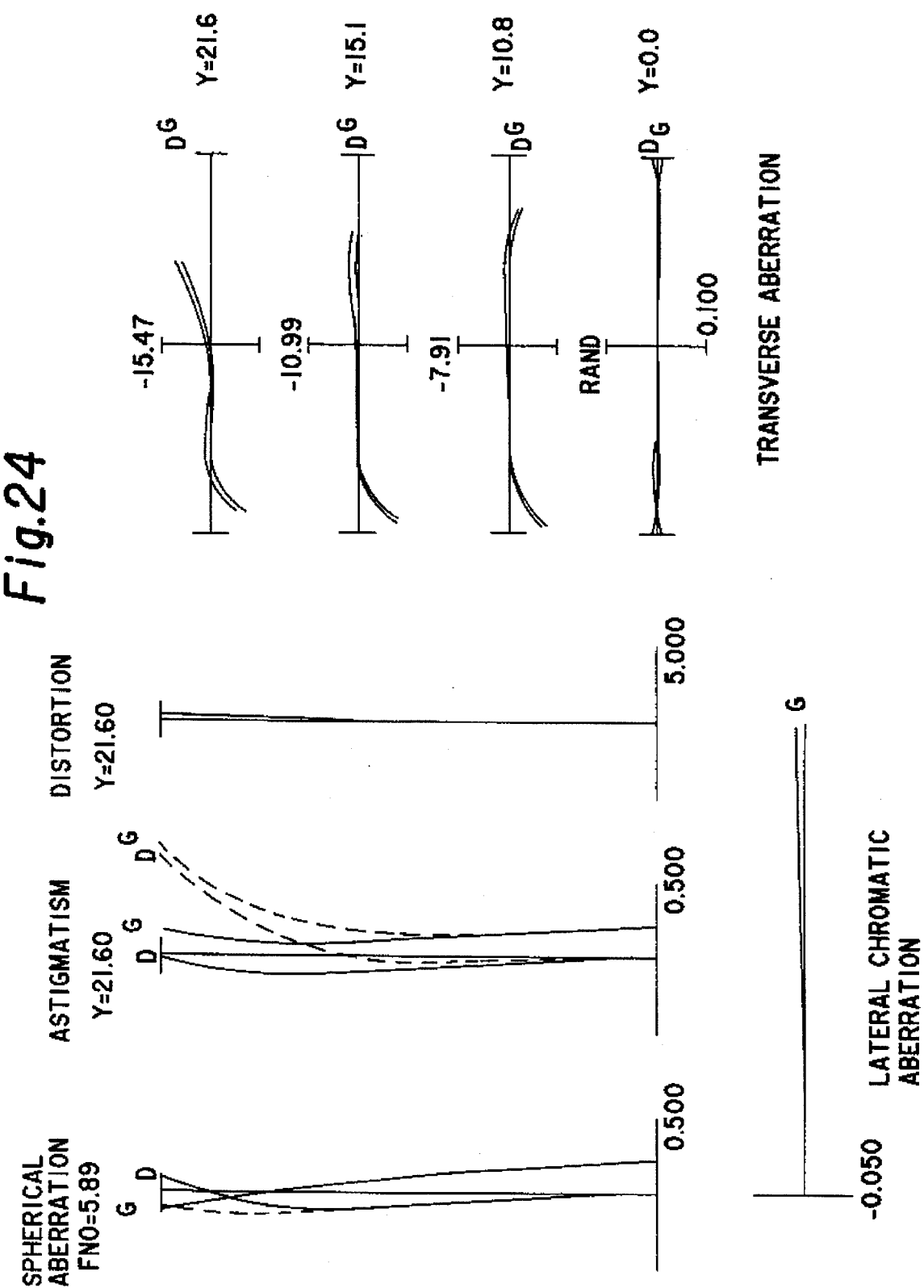
FIG. 24 graphically shows various aberrations at the tele end in Example 6.

FIGS. 22 to 24 graphically show various aberrations in Example 6: FIG. 22 shows various aberrations at the wide end; FIG. 23 shows various aberrations at a middle focal length position; and FIG. 24 shows various aberrations at the tele end.

In these figures, $F_{NO}$ is F-number, Y is the image height, D is the d-line (λ=587.6 nm), and G is the g-line (λ=435.8 nm).

In the graphs showing astigmatism, the solid line shows a sagittal image surface, and the broken line shows a meridional image surface. In the graphs showing spherical aberration, the broken line shows the sine condition.

It will be clearly understood from these figures that the zoom lens system in this example is favorably corrected for various aberrations at each focal length position.

As has been described above, it is possible according to the present invention to realize a two-unit zoom lens system which has a zoom ratio of 2.1 or more, a compact structure over the entire zoom range, a simple arrangement, and yet favorable image-forming performance.

What is claimed is:

1. A zoom lens system comprising, in order from an object side, a first lens unit having a negative refractive power as a whole, and a second lens unit having a positive refractive power as a whole, wherein zooming is effected by varying a spacing between said first lens unit and said second lens unit, said first lens unit having, in order from the object side, a first negative lens element, which is meniscus type, having a convex surface directed toward the object side, a second negative lens element, and a positive lens element, said second lens unit having, in order from the object side, a first positive lens element having a convex surface directed toward the object side, a second positive lens element, a cemented negative lens element which is composed of a third positive lens element and a negative lens element, which are cemented together, and a fourth positive lens element, said zoom lens system satisfying the following conditions:

$0.65 \leq |f1|/(fw \cdot ft)^{1/2} \leq 1.0$ $-1 < q2 \leq 0$ where f1 is a focal length of said first lens unit, fw is a focal length of the entire lens system at a wide end, ft is a focal length of the entire lens system at a tele end, and q2 is a shape factor of said second negative lens element in said first lens unit.

2. A zoom lens system according to claim 1, which satisfies the following condition:

$0.7 \leq f2/|f1| \leq 0.95$ where f1 is a focal length of said first lens unit, and f2 is a focal length of said second lens unit.

3. A zoom lens system according to claim 1, which satisfies the following condition:

$0.1 \leq d78/fw \leq 0.25$ where d78 is an axial air spacing between an image-side surface of said cemented negative lens element and an object-side surface of said fourth positive lens element in said second lens unit, and fw is a focal length of the entire lens system at a wide end.

4. A zoom lens system according to claim 2, which satisfies the following condition:

$0.1 \leq d78/fw \leq 0.25$ where d78 is an axial air spacing between an image-side surface of said cemented negative lens element and an object-side surface of said fourth positive lens element in said second lens unit, and fw is a focal length of the entire lens system at a wide end.

5. A zoom lens system according to claim 1, which satisfies the following condition:

$0 \leq q3 \leq 1.1$ $-1 \leq q8 \leq 0$ where q3 is a shape factor of said positive lens element in said first lens unit, and q8 is a shape factor of said fourth positive lens element in said second lens unit.

6. A zoom lens system according to claim 2, which satisfies the following condition:

$0 \leq q3 \leq 1.1$ $-1 \leq q8 \leq 0$ where q3 is a shape factor of said positive lens element in said first lens unit, and q8 is a shape factor of said fourth positive lens element in said second lens unit.

7. A zoom lens system according to claim 3, which satisfies the following condition:

$0 \leq q3 \leq 1.1$ $-1 \leq q8 \leq 0$ where q3 is a shape factor of said positive lens element in said first lens unit, and q8 is a shape factor of said fourth positive lens element in said second lens unit.

8. A zoom lens system according to claim 4, which satisfies the following condition:

$0 \leq q3 \leq 1.1$ $-1 \leq q8 \leq 0$ where q3 is a shape factor of said positive lens element in said first lens unit, and q8 is a shape factor of said fourth positive lens element in said second lens unit.

9. A zoom lens system comprising, in order from an object side, a first lens unit having a negative refractive power as a whole, and a second lens unit having a positive refractive power as a whole, said first lens unit having, in order from the object side, a negative meniscus lens element having a convex surface directed toward the object side, a biconcave lens element, and a positive lens element, said second lens unit having, in order from the object side, a first positive lens element, a second positive lens element, a biconcave lens element, and a third positive lens element, said zoom lens system being arranged to effect zooming by varying a spacing between said first lens unit and said second lens unit, said zoom lens system satisfying the following conditions:

$0.6 \leq |f1|/(fw \cdot ft)^{1/2} \leq 1$ $-1 \leq q2 \leq 0$ $0.04 \leq d4/dI \leq 0.4$ where f1 is a focal length of said first lens unit, fw is a focal length of the entire lens system at a wide end, ft is a focal length of the entire lens system at a tele end, q2 is a shape factor of said biconcave lens element in said first lens unit, d4 is an axial air spacing between said biconcave lens element and said positive lens element in said first lens unit, and dI is an axial overall thickness of said first lens unit.

10. A zoom lens system according to claim 9, which satisfies the following condition:

$0.7 \leq f2/|f1| \leq 0.95$ where f1 is a focal length of said first lens unit, and f2 is a focal length of said second lens unit.

11. A zoom lens system according to claim 9 or 10, which satisfies the following condition:

$$0.5 \leq f11/f12 \leq 1$$

where f11 is a focal length of said negative meniscus lens element in said first lens unit, and f12 is a focal length of said biconcave lens element in said first lens unit.

12. A zoom lens system according to claim 1, which satisfies the following condition:

$$1.6 < n1, 1.6 < n2$$

$$d7/d67 < 0.55$$

$$0.1 \leq Nn-Np$$

$$10 \leq \gamma dp - \gamma dn$$

where n1 is a refractive index of said first negative meniscus lens element in said first lens unit, n2 is a refractive index of the second negative lens element in said first lens unit, d67 is an axial composite thickness of the cemented negative lens element in said second lens unit, d7 is an axial center thickness of said negative lens element constituting said cemented negative lens element in said second lens unit, Nn is a refractive index of said negative lens element constituting said cemented negative lens element in said second lens unit, Np is a refractive index of said third positive lens element constituting said cemented negative lens element in said second lens unit, γdn is the Abbe's number of said negative lens element constituting said cemented negative lens element in said second lens unit and γdp is the Abbe's number of said third positive lens element constituting said cemented negative lens element in said second lens unit.

13. A zoom lens system according to claim 2, which satisfies the following condition:

$$1.6 < n1, 1.6 < n2$$

$$d7/d67 < 0.55$$

$$0.1 \leq Nn-Np$$

$$10 \leq \gamma dp - \gamma dn$$

where n1 is a refractive index of said first negative meniscus lens element in said first lens unit, n2 is a refractive index of the second negative lens element in said first lens unit, d67 is an axial composite thickness of the cemented negative lens element in said second lens unit, d7 is an axial center thickness of said negative lens element constituting said cemented negative lens element in said second lens unit, Nn is a refractive index of said negative lens element constituting said cemented negative lens element in said second lens unit, Np is a refractive index of said third positive lens element constituting said cemented negative lens element in said second lens unit, γ dn is the Abbe's number of said negative lens element constituting said cemented negative lens element in said second lens unit and γ dp is the Abbe's number of said third positive lens element constituting said cemented negative lens element in said second lens unit.

14. A zoom lens system according to claim 3, which satisfies the following condition:

$$1.6 < n1, 1.6 < n2$$

$$d7/d67 < 0.55$$

$$0.1 \leq Nn-Np$$

$$10 \leq \gamma dp - \gamma dn$$

where n1 is a refractive index of said first negative meniscus lens element in said first lens unit, n2 is a refractive index of the second negative lens element in said first lens unit, d67 is an axial composite thickness of the cemented negative lens element in said second lens unit, d7 is an axial center thickness of said negative lens element constituting said cemented negative lens element in said second lens unit, Nn is a refractive index of said negative lens element constituting said cemented negative lens element in said second lens unit, Np is a refractive index of said third positive lens element constituting said cemented negative lens element in said second lens unit, γdn is the Abbe's number of said negative lens element constituting said cemented negative lens element in said second lens unit and γdp is the Abbe's number of said third positive lens element constituting said cemented negative lens element in said second lens unit.

15. A zoom lens system according to claim 5, which satisfies the following condition:

$$1.6 < n1, 1.6 < n2$$

$$d7/d67 < 0.55$$

$$0.1 \leq Nn-Np$$

$$10 \leq \gamma dp - dn$$

where n1 is a refractive index of said first negative meniscus lens element in said first lens unit, n2 is a refractive index of the second negative lens element in said first lens unit, d67 is an axial composite thickness of the cemented negative lens element in said second lens unit, d7 is an axial center thickness of said negative lens element constituting said cemented negative lens element in said second lens unit, Nn is a refractive index of said negative lens element constituting said cemented negative lens element in said second lens unit, Np is a refractive index of said third positive lens element constituting said cemented negative lens element in said second lens unit, γdn is the Abbe's number of said negative lens element constituting said cemented negative lens element in said second lens unit and γdp is the Abbe's number of said third positive lens element constituting said cemented negative lens element in said second lens unit.

16. A zoom lens system according to claim 1, further comprising an aperture stop for determining an F-number, said aperture stop being provided between said first lens unit and said second lens unit.

17. A zoom lens system according to claim 9, which satisfies the following condition:

$$0 < r10$$

$$0.15 < d12/d11$$

where r10 is a radius of curvature of the image-side surface of said second positive lens element in said second lens unit, d12 is an axial air spacing between said biconcave lens element and said third positive lens element in said second lens unit and d11 is an axial overall thickness of said second lens unit.

18. A zoom lens system according to claim 10, which satisfies the following condition:

$$0 < r10$$

$0.15 < d12/dII$ where r10 is a radius of curvature of the image-side surface of said second positive lens element in said second lens unit, d12 is an axial air spacing between said biconcave lens element and said third positive lens element in said second lens unit and d11 is an axial overall thickness of said second lens unit.

19. A zoom lens system according to claim 11, which satisfies the following condition:

$0 < r10$ $0.15 < d12/dII$ where r10 is a radius of curvature of the image-side surface of said second positive lens element in said second lens unit, d12 is an axial air spacing between said biconcave lens element and said third positive lens element in said second lens unit and d11 is an axial overall thickness of said second lens unit.

* * * * *